(12) United States Patent
Iwashima et al.

(10) Patent No.: US 10,029,631 B2
(45) Date of Patent: Jul. 24, 2018

(54) ELECTRIC SYSTEM STABILIZING SYSTEM FOR AIRCRAFT

(71) Applicants: Kawasaki Jukogyo Kabushiki Kaisha, Kobe-shi, Hyogo (JP); The Boeing Company, Chicago, IL (US)

(72) Inventors: Atsushi Iwashima, Yamagata (JP); Kazushige Sugimoto, Amagasaki (JP); Kazuya Matsuo, Kobe (JP); Joseph S. Breit, Bellevue, WA (US); Farhad Nozari, Woodinville, WA (US)

(73) Assignees: KAWASAKI JUKOGYO KABUSHIKI KAISHA, Kobe-Shi, Hyogo (JP); THE BOEING COMPANY, Chicago, IL (US)

( * ) Notice: Subject to any disclaimer, the term of this patent is extended or adjusted under 35 U.S.C. 154(b) by 586 days.

(21) Appl. No.: 14/418,075

(22) PCT Filed: Jul. 29, 2013

(86) PCT No.: PCT/US2013/052583
§ 371 (c)(1),
(2) Date: Jan. 28, 2015

(87) PCT Pub. No.: WO2014/022316
PCT Pub. Date: Feb. 6, 2014

(65) Prior Publication Data
US 2015/0183385 A1    Jul. 2, 2015

Related U.S. Application Data

(63) Continuation-in-part of application No. 13/561,572, filed on Jul. 30, 2012, now abandoned.

(51) Int. Cl.
*B60L 11/18*    (2006.01)
*B60R 16/03*    (2006.01)
(Continued)

(52) U.S. Cl.
CPC .......... *B60R 16/03* (2013.01); *B60L 11/1809* (2013.01); *B64D 41/007* (2013.01);
(Continued)

(58) Field of Classification Search
USPC ............................................. 307/9.1; 244/58
See application file for complete search history.

(56) References Cited

U.S. PATENT DOCUMENTS 6,018,233 A    1/2000    Glennon
6,778,414 B2   8/2004    Chang et al.
(Continued)

FOREIGN PATENT DOCUMENTS

CA    2805817 A1    1/2012
EP    2040370 A2    3/2009
(Continued)

OTHER PUBLICATIONS

Zhang, H. et al., "Experimental Validation of Energy Storage System Management Strategies for a Local DC Distribution System of More Electric Aircraft," IEEE Transactions on Industrial Electronics, vol. 57, No. 12, Dec. 2010, Published Online Mar. 29, 2010, 12 pages.

(Continued)

*Primary Examiner* — Rexford Barnie
*Assistant Examiner* — Xuan Ly
(74) *Attorney, Agent, or Firm* — Alleman Hall Creasman & Tuttle LLP

(57) ABSTRACT

A power stabilizing device in a system includes as a portion of a power converter section, a second PWM converter provided between a second primary AC bus and a second DC bus in an electric system and configured to perform mutual conversion between DC power and AC power. A power stabilizing control section in the power stabilizing device controls charging and discharging of a secondary (Continued)

battery based on a voltage and a frequency in the second primary AC bus, thereby stabilizing the electric system.

20 Claims, 16 Drawing Sheets

(51) Int. Cl.
    *B64D 41/00*     (2006.01)
    *H02J 3/32*     (2006.01)
    *H02J 4/00*     (2006.01)

(52) U.S. Cl.
    CPC ............... *H02J 3/32* (2013.01); *H02J 4/00* (2013.01); *B64D 2221/00* (2013.01); *Y02T 50/54* (2013.01)

(56) References Cited

U.S. PATENT DOCUMENTS

| | | | |
|---|---|---|---|
| 7,701,082 | B2 | 4/2010 | Lazarovich et al. |
| 7,859,874 | B2 | 12/2010 | Bovitz |
| 2004/0119454 | A1 | 6/2004 | Chang et al. |
| 2004/0129835 | A1 | 7/2004 | Atkey et al. |
| 2006/0061213 | A1* | 3/2006 | Michalko .............. H02J 4/00 307/9.1 |
| 2009/0302153 | A1 | 12/2009 | Matasso et al. |
| 2009/0326737 | A1 | 12/2009 | Derouineau et al. |
| 2010/0193629 | A1 | 8/2010 | Breit et al. |
| 2010/0252691 | A1* | 10/2010 | Malkin ................. B64C 13/28 244/76 R |
| 2011/0215640 | A1* | 9/2011 | Donnelly ............... H02J 1/10 307/21 |
| 2011/0260690 | A1* | 10/2011 | Kojori ................... H02J 3/32 320/134 |
| 2011/0291606 | A1 | 12/2011 | Lee |
| 2012/0007551 | A1* | 1/2012 | Song ................... B60L 11/1814 320/109 |
| 2012/0091967 | A1 | 4/2012 | Kawamoto et al. |
| 2012/0098329 | A1 | 4/2012 | Jones et al. |
| 2012/0297108 | A1 | 11/2012 | Mitani et al. |

FOREIGN PATENT DOCUMENTS

| | | | |
|---|---|---|---|
| EP | 2213571 | A2 | 8/2010 |
| JP | 2006516230 | A | 6/2006 |
| JP | 2007-15423 | A | 1/2007 |
| JP | 2009195018 | A | 8/2009 |
| JP | 2011517271 | A | 5/2011 |
| JP | 2012143018 | * | 7/2012 |
| JP | 2012143018 | A | 7/2012 |
| WO | 2004037641 | A2 | 5/2004 |
| WO | 2009125007 | A2 | 10/2009 |
| WO | 2012012482 | A1 | 1/2012 |

OTHER PUBLICATIONS

Canadian Intellectual Property Office, Office Action Issued in Canada Patent Application No. 2,871,962, dated Jan. 5, 2016, Canada, 4 pages.
State Intellectual Property Office of the People's Republic of China, Office Action and Search Report Issued in Application No. 201380039140.3, dated May 5, 2016, 10 pages. (Submitted with Translation of Search Report).
Sugimoto et al., Machine Translation of Specification and Figures of JP2012143018, "System Stabilization Apparatus and System Stabilization Method," Jul. 26, 2012, 31 pages.
International Bureau of WIPO, International Preliminary Report on Patentability Issued in Application No. PCT/US2013/052583, dated Feb. 12, 2015, WIPO, 8 pages.
United States Patent and Trademark Office, Office Action Issued in U.S. Appl. No. 13/561,572, dated May 21, 2015, 31 pages.
Korean Intellectual Property Office, International Search Report of PCT/US2013/052583, WIPO, dated Nov. 21, 2013, 3 pages.
European Patent Office, Extended European Search Report Issued in Application No. 13825807.4, dated Mar. 29, 2016, Germany, 6 pages.
Canadian Intellectual Property Office, Office Action Issued in Canadian Application No. 2,871,962, dated Oct. 24, 2017, 6 pages.
Liu, "A Hybrid AC/DC Microgrid and Its Coordination Control," IEEE Transactions on Smart Grid, vol. 2, No. 2, Jun. 2011, 9 pages.

* cited by examiner

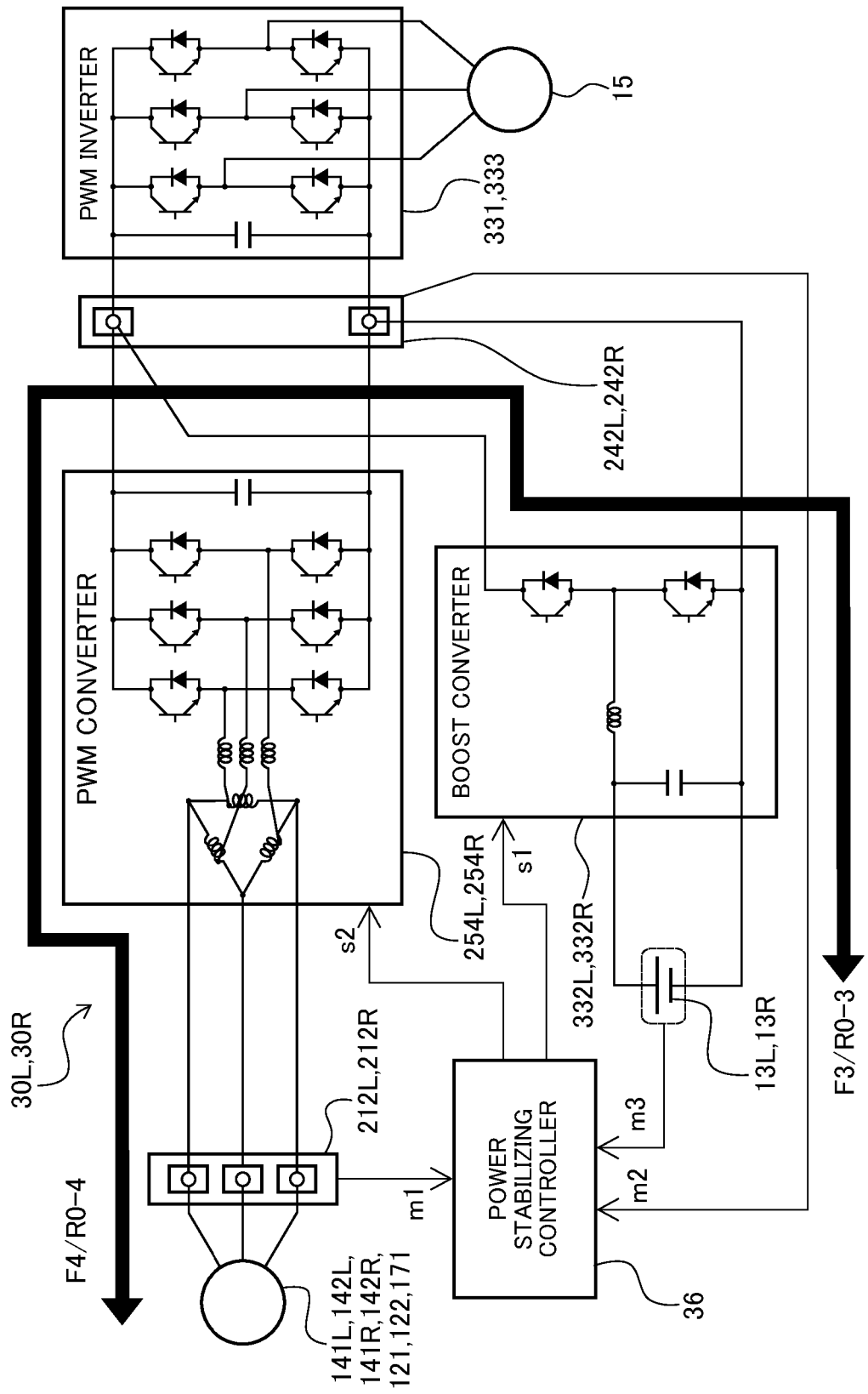

ELECTRIC SYSTEM STABILIZING SYSTEM FOR AIRCRAFT

TECHNICAL FIELD

The present invention relates to an electric system stabilizing system for an aircraft. Particularly, the present invention relates to an electric system stabilizing system for an aircraft, which is capable of stabilizing an electric system which includes an AC power supply and a DC power supply and is electrically driven mainly based on AC power.

BACKGROUND ART

Typically, as power systems for an aircraft, three kinds of systems, which are a hydraulic system, a breed air system, and an electric system, are incorporated into the aircraft. The hydraulic system is employed for the operation of landing gears, control surfaces, etc. The breed air system is employed for the operation of air conditioning devices, pressure application devices, de-icing devices, and others, in the interior of the aircraft. The electric system is employed for the operation of electronic devices. In recent years, there has been a trend that at least a portion of the hydraulic system and a portion of the breed air system are replaced by the electric system having a higher efficiency. The aircraft in which the hydraulic system, the breed air system, and other system are replaced as much as possible by the electric system, is typically named MEA (more electric aircraft).

For example, it is known that the breed air system generates a great energy loss. By constructing the breed air system as the electric system, a fuel efficiency can be improved. In the hydraulic system and the breed air system, pipes are required to circulate or send power media (hydraulic oil in the case of the hydraulic system, air in the case of the breed air system), in both of the hydraulic system and the breed air system. For this reason, if at least one of the hydraulic system and the breed air system is constructed as the electric system, piping layout or a mounting work of the pipes can be simplified or omitted, which can reduce manufacturing cost. Moreover, if all of the power systems can be replaced by the electric systems, maintenance of only the electric systems is performed, which allows the power systems to be managed more easily and maintained more easily.

However, with a progress of the MEA in the aircraft, power loads (devices supplied with electric power from the electric systems) supplied with electric power from the electric systems significantly increase in quantity and number. Accordingly, it becomes necessary to increase a power generation capacity. If the power generation capacity is increased, the size of generators increases and wire quantities increase. This would result in an increase in the weight of the aircraft. In view of this, in the progress of the MEA in the aircraft, it is required to avoid and suppress the increase in the weight of the aircraft. For example, Patent Literature 1: Japanese Laid-Open Patent Application Publication No. 2007-015423 discloses that a lightweight and high-efficiency power supply system is provided in all electric aircraft (AEA) by changing a general concentrated power distribution method to a dispersed power distribution method, in an electric system.

FIG. 16 shows an example of an electric system of an MEA at the present moment. In this electric system, two starter/generators are provided for each of a left engine 11L, a right engine 11R, and an auxiliary power unit (APU) 12 in the aircraft. These starter/generators are able to generate AC power of 230 VAC. The AC power of 230 VAC is rectified by automatic transformer-rectifiers (ATRU) 255L, 255R via primary AC power supply buses 211L, 212L, 211R, 212R, and DC power of +/−270 VDC is supplied to motor controllers 331 of power loads 15 via DC power supply buses 241L, 242L, 241R, 242R. Under control of the motor controllers 331, driving motors (M in FIG. 14) included in the power loads 152 are actuated.

In implementation of the MEA in the aircraft, it is required that an electric system be stabilized by suppressing a change (fluctuation) in a power supply voltage as well as addressing the increase in a power generation amount. For example, if regenerative power occurs in a load in which greater regenerative power (return of electric power) occurs as compared to another load, such as an actuator for controlling a control surface, a voltage in the electric system significantly increases temporarily (for a specified time). Or, if the power loads to be supplied with the electric power increase in number temporarily, a significant voltage decrease (drop) occurs.

Various approaches for avoiding or suppressing the change in the power supply voltage have been proposed so far. For example, to address the above stated problem associated with the regenerative power from the great load, it is known that a resistor is built into a controller of the load (e.g., actuator). In accordance with this configuration, the regenerative power is converted into heat by the resistor and consumed. That is, the regenerative power is prevented from returning to the electric system. To address the voltage decrease (drop) due to the temporary increase in the loads, it is known that AC power generators having a power generation capacity made greater to correspond to the degree of the voltage decrease. Also, Patent Literature 2: US Patent Publication NO. 2009/0302153 discloses an electric system in which surplus electric power such as regenerative power is absorbed or deficient electric power due to a voltage decrease is made up for, by using a DC power supply such as a battery or a capacitor, in a small-sized aircraft.

CITATION LIST

Patent Literature

Patent Literature 1: Japanese Laid-Open Patent Application Publication No. 2007-015423

Patent Literature 2: US Patent Publication NO. 2009/0302153

SUMMARY OF INVENTION

Technical Problem

However, Patent Literature 1 does not disclose avoidance or suppressing a change in power supply voltage. The electric system disclosed in Patent Literature 2 is electrically driven mainly by DC 270V. Although it is recited that this electric system is also applicable to AC115V, etc., its specific application is not explicitly disclosed. Since the electric system in a general commercial aircraft is electrically driven mainly by AC, a technique intended for the electric system electrically driven mainly by the DC is not applicable to the electric system electrically driven mainly by AC unless it is modified.

The present invention has been developed to solve the above described problems, and an object of the present invention is to provide an electric system stabilizing system for an aircraft, which is capable of favorably stabilizing an electric system while avoiding a weight increase, without a great design change, in an aircraft having been more electrified and including the electric system which is electrically driven mainly by AC power.

Solution to Problem

To solve the above mentioned problem, according to the present invention, there is provided an electric system stabilizing system for aircraft, comprising at least: an electric system including a DC power supply and an AC power supply as an electric power supply device, an AC power supply bus connected to the AC power supply, a DC power supply bus connected to the DC power supply, and a power converter section for converting AC power from at least the AC power supply into DC power to supply the DC power to the DC power supply bus via the AC power supply bus, the electric system being configured to supply electric power to an electrified device mounted in the aircraft via the AC power supply bus and the DC power supply bus; and a power stabilizing device for stabilizing an electric power output of the electric power supply device; wherein the DC power supply is configured to absorb regenerative power from the electrified device and transiently supply the electric power to the electrified device; wherein the power stabilizing device includes a power stabilizing control section for controlling conversion of the electric power in the power converter section; and wherein the power stabilizing control section causes the DC power supply to be charged and discharged, based on a voltage in the AC power supply bus and a voltage in the DC power supply bus to stabilize the electric power in the AC power supply bus and the electric power in the DC power supply bus so that the electric system is stabilized.

In the electric system stabilizing system for aircraft having the above configuration, the aircraft may include an auxiliary power unit (APU) and a ram air turbine (RAT), the electric system may include as the AC power supplies, an APU starter/generator mounted to the auxiliary power unit and configured to generate the AC power; an AC power generator mounted to the engine, and a RAT generator mounted to the ram air turbine; the electric system may include as the DC power supply, at least one of a secondary battery and a capacitor; the DC power supply and the APU starter/generator are each connected to the power stabilizing device; the AC power generator and the RAT generator may be connected to the power stabilizing device via the AC power supply bus; and the APU starter/generator be connected to the power stabilizing device via the AC power supply bus.

In the electric system stabilizing system for aircraft having the above configuration, to activate the auxiliary power unit in a deactivated state, the power stabilizing control section may cause the power converter section to boost the DC power from the DC power supply and supply the DC power to activate the APU starter/generator.

In the electric system stabilizing system for aircraft having the above configuration, in a state in which the DC power supply is in a chargeable state, the power stabilizing control section may cause the power converter section to convert the AC power from the AC power generator or the APU starter/generator into the DC power, convert the DC power into a voltage adapted for charging by a boost converter, and supply the converted DC power to the DC power supply, to charge the DC power supply with the DC power.

In the electric system stabilizing system for aircraft having the above configuration, the electric system may include: an essential bus supplied with the electric power from the AC power generator via the AC power supply bus and having a lower rated voltage than the DC power supply; and a voltage converter interposed between the essential bus and the DC power supply; wherein the DC power supply may be always connected to the essential bus via the power converter section; and wherein in a state in which the AC power is not supplied from the AC power generator to the essential bus, the electric power may be supplied to the essential bus without discontinuation.

In the electric system stabilizing system for aircraft having the above configuration, in a state in which the AC power generator is deactivated and the RAT generator is supplying the AC power to the AC power supply bus, the power stabilizing control section may cause the power converter section to convert the AC power from the RAT generator into the DC power and supply the DC power to the essential bus.

In the electric system stabilizing system for aircraft having the above configuration, in the electric system, the single engine may be provided with a plurality of AC power generators; and each of the AC power generators may be coupled with a system including the AC power supply bus, the power converter section, and the DC power supply bus, to construct a corresponding one of a plurality of lower systems, the plurality of lower systems corresponding to the plurality of AC power generators, respectively; and in the plurality of lower systems, the AC power supply buses may be connected to each other and the DC power supply buses are connected to each other.

In the electric system stabilizing system for aircraft having the above configuration, in the plurality of lower systems included in the electric system, the DC power supply bus in at least one of the lower systems may be connected to the APU starter/generator via a controller of the electrified device.

In the electric system stabilizing system for aircraft having the above configuration, the electric system may include, as the power converter section, a PWM (Pulse With Modulation) converter for performing mutual conversion between the DC power and the AC power, and a boost converter coupled to the PWM converter via the DC power supply bus; and the power stabilizing control section may cause the power converter section to charge and discharge the DC power supply based on a voltage in the AC power supply bus and a voltage in the DC power supply bus, to stabilize the electric power in the AC power supply bus and the electric power in the DC power supply bus.

In the electric system stabilizing system for aircraft having the above configuration, the power stabilizing control section may measure the voltage or frequency in the AC power supply bus and determines that a first-order lag value of a measurement value of the voltage or frequency in the AC power supply bus is a target value in control; the power stabilizing control section may adjust a preset reference voltage command value for the boost converter based on a difference between the target value and the measurement value; and the power stabilizing control section may control an output current of the boost converter based on a difference between the adjusted reference voltage command value and the measurement value; and the power stabilizing control section may control active power and reactive power in the PWM converter based on a difference between a measurement value of the voltage in the DC power supply bus and the preset reference voltage value of the PWM converter.

In the electric system stabilizing system for aircraft having the above configuration, wherein the power stabilizing control section may multiply a difference between the target value and the measurement value of the voltage or frequency of the AC power supply bus by a preset proportional constant, to generate a base value of the reference voltage command value, and generates a compensation voltage value from a difference between the measurement value of SOC of the DC power supply and a preset target value of the SOC; the power stabilizing control section may add the compensation voltage value and a preset target value of the reference voltage of the boost converter to the base value to generate a final value of the reference voltage command value; and the power stabilizing control section may control an output current of the boost converter based on a difference between the final value of the reference voltage command value and the measurement value.

In the electric system stabilizing system for aircraft having the above configuration, the power stabilizing control section may add to the base value of the reference voltage command value, the compensation voltage value, the target value of the reference voltage, and an overload compensation value preset to supply auxiliary electric power from the DC power supply to the AC power supply bus, to generate a final value of the reference voltage command value.

In the electric system stabilizing system for aircraft having the above configuration, in a state in which the AC power is not supplied from the AC power generator to the electrified device via the AC power supply bus, the power stabilizing control section may cause the power converter section to convert the DC power from the DC power supply into the AC power and supply the AC power to the electrified device via the AC power supply bus for a specified time period.

In the electric system stabilizing system for aircraft having the above configuration, the electric system may include as the power converter section, a rectifier provided between the AC power supply bus and the DC power supply bus to convert the AC power into the DC power; and a boost converter connected to the DC power supply bus; and the power stabilizing control section may cause the DC power supply to be charged and discharged based on a voltage in the AC power supply bus and a voltage in the DC power supply bus to stabilize the electric power in the AC power supply bus and the electric power in the DC power supply bus.

In the electric system stabilizing system for aircraft having the above configuration, the power stabilizing control section may monitor a state of charge (SOC) of the DC power supply and makes compensation for a charging/discharging amount of the DC power supply based on a difference between a measurement value of the SOC and a preset target value of a charging rate.

In the electric system stabilizing system for aircraft having the above configuration, when the AC power generated in the AC power supply has a variable frequency, the power stabilizing control section may cause the power converter section to charge the DC power supply in proportion to an increase in the voltage in order to make input of the active power increase, to input reactive power with a lagging power factor in proportion to the increase in the voltage, or to charge the DC power supply in proportion to the increase in the voltage in order to make the input of the active power increase and input the reactive power with the lagging power factor in proportion to the increase in the voltage, if the increase in the voltage is monitored; and wherein when the AC power generated in the AC power supply has a variable frequency, the power stabilizing control section may cause the power converter section to discharge from the DC power supply in proportion to a decrease in the voltage in order to make input of the active power decrease, to input the reactive power with a leading power factor in proportion to the decrease in the voltage, or to discharge from the DC power supply in proportion to the decrease in the voltage in order to make the input of the active power decrease and input the reactive power with the leading power factor in proportion to the decrease in the voltage, if the decrease in the voltage is monitored.

In the electric system stabilizing system for aircraft having the above configuration, when the AC power generated in the AC power supply has a constant frequency, the power stabilizing control section may cause the power converter section to charge the DC power supply in proportion to an increase in the frequency in order to make the input of the active power increase, if the increase in the frequency is monitored; and when the AC power generated in the AC power supply has a constant frequency, the power stabilizing control section may cause the power converter section to discharge from the DC power supply in proportion to a decrease in the frequency in order to make the input of the active power decrease, if the decrease in the frequency is monitored.

In the electric system stabilizing system for aircraft having the above configuration, when the AC power generated in the AC power supply has a constant frequency, the power stabilizing control section may cause the power converter section to input reactive power with a lagging power factor in proportion to an increase in the voltage if the increase in the voltage is monitored; and when the AC power generated in the AC power supply has a constant frequency, the power stabilizing control section may cause the power converter section to input reactive power with a leading power factor in proportion to a decrease in the voltage if the decrease in the voltage is monitored.

In the electric system stabilizing system for aircraft having the above configuration, in the aircraft, at least either a hydraulic system or a breed air system may be electrically driven; and a controller of the hydraulic system or breed air system which is electrically driven, may be connected to the DC power supply bus.

To solve the above mentioned problem, according to the present invention, there is provided a method of stabilizing an electric system for aircraft, the electric system including a DC power supply and an AC power supply as an electric power supply device, an AC power supply bus connected to the AC power supply, a DC power supply bus connected to the DC power supply, and a power converter section for converting AC power from at least the AC power supply into DC power to supply the DC power to the DC power supply bus via the AC power supply bus, the electric system being configured to supply electric power to an electrified device mounted in the aircraft via the AC power supply bus and the DC power supply bus, the method comprising: using as the DC power supply, a DC power supply configured to absorb regenerative power from the electrified device and transiently supply the electric power to the electrified device; and charging and discharging the DC power supply based on a voltage in the AC power supply bus and a voltage in the DC power supply bus, to stabilize the electric power in the AC power supply bus and the electric power in the DC power supply bus, thereby stabilizing the electric system.

The above and further objects, features and advantages of the present invention will more fully be apparent from the following detailed description of preferred embodiments with reference to accompanying drawings.

Advantageous Effects of Invention

As described above, according to the present invention, it achieves an advantageous effect that provide an electric system stabilizing system for an aircraft, which is capable of favorably stabilizing an electric system while avoiding a weight increase, without a great design change, in an aircraft having been more electrified and including the electric system which is electrically driven mainly by AC power.

BRIEF DESCRIPTION OF DRAWINGS

FIG. 4 is a schematic block diagram showing main components in the electric system stabilizing system for the aircraft of FIG. 2 and showing an exemplary state in which charging/discharging of a secondary battery is controlled by the AC power stabilizing device of FIG. 3.

DESCRIPTION OF EMBODIMENTS

Figure 1A:
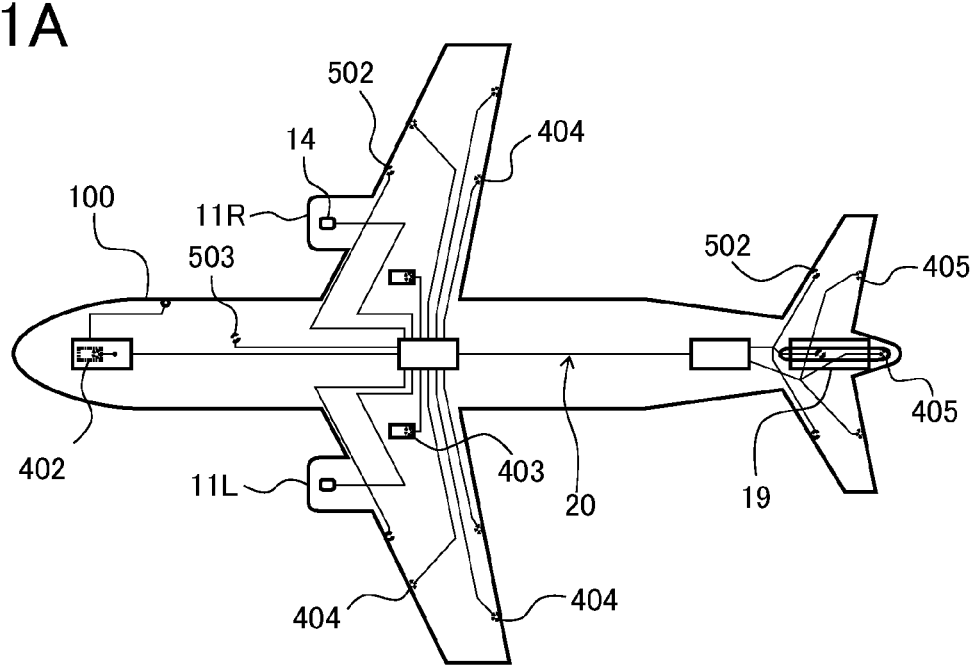
FIG. 1A is a schematic view showing a configuration of an electric system of an aircraft to which an electric system stabilizing system for an aircraft according to Embodiment 1 or 2 of the present invention is applicable.

Hereinafter, preferred embodiments of the present invention will be described with reference to the drawings. Throughout the drawings, the same or corresponding components are designated by the same reference numerals and will not be described in repetition.

Embodiment 1

[Power Systems of Aircraft]

First of all, a schematic configuration of power systems in an aircraft to which an electric system stabilizing system for an aircraft according to Embodiment 1 of the present invention is applied will be described with reference to FIGS. 1A, 1B. Hereinafter, for easier description, "electric system stabilizing system for an aircraft" will be simply referred to as "stabilizing system".

The stabilizing system of the present embodiment is provided in MEA (or AEA) in which at least a portion of a hydraulic system and/or a portion of a breed air system are constructed as electric systems. FIG. 1A shows a schematic configuration of an aircraft 100 in which all of the power systems are constructed as electric systems, and FIG. 1B shows a schematic configuration of a conventional general aircraft 900 including power systems.

Figure 1B:
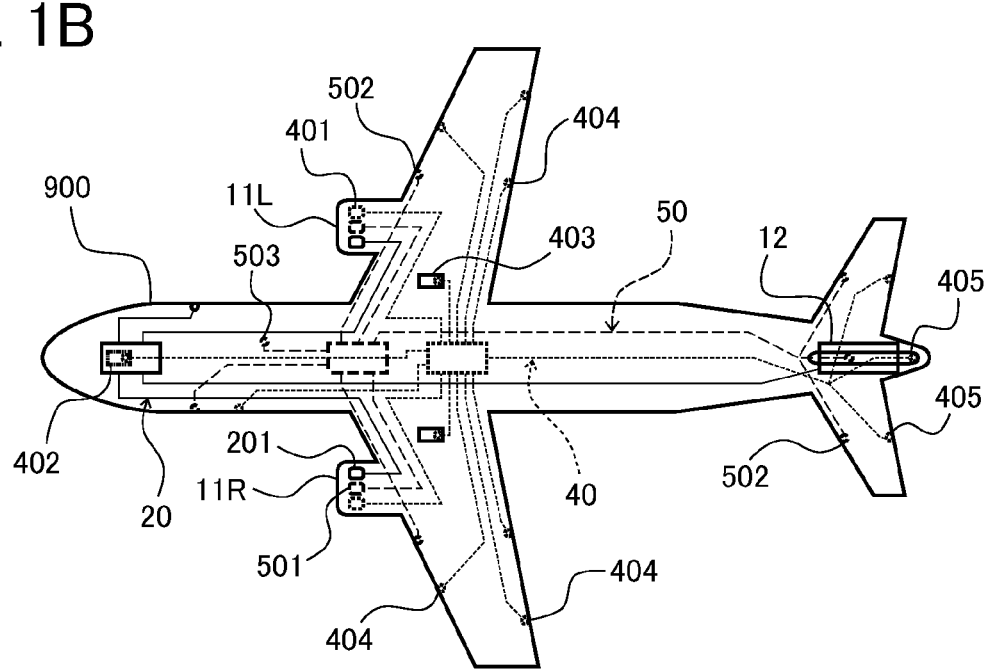
FIG. 1B is a schematic view showing a configuration of power systems of a conventional general aircraft.

The general aircraft 900 includes a hydraulic system 40 indicated by a dotted line in FIG. 1B and a breed air system 50 indicated by a broken line in FIG. 1B, in addition to an electric system 20 indicated by a solid line. Each of a left engine 11L and a right engine 11R includes one generator 201, one hydraulic pump 401 and one engine starter 501. The generator 201 is connected to the electric system 20, a hydraulic pump 401 is connected to the hydraulic system 40, and an engine starter 501 is connected to the breed air system 50. An auxiliary power unit (APU) 12 is mounted in the rear portion of the general aircraft 900. An APU starter/generator (not shown in 1B) included in the APU 12 is connected to the electric system 20.

Although the electric system 20 is not shown in detail, power loads (devices built into the aircraft, electrified devices) built into the aircraft 900 are supplied with the electric power from the generator 201 or from the APU starter/generator. The hydraulic system 40 is connected to actuators of, for example, a nose landing gear 402, main landing gears 403, main wing control surfaces 404, tail wing control surfaces 405, and others. The actuators are driven by the hydraulic pump 401. The breed air system 50 is connected to a de-icing device 502 mounted at the main wing or the tail wing, or an air-conditioning pressure application device 503 mounted in a fuselage, supplies the air to the de-icing device 502, the air-conditioning pressure application device 503, etc. In addition, the breed air system 50 actuates the engine starter 501 by high-pressure air, thereby activating the each of the left engine 11L and the right engine 11R.

By comparison, for example, in the aircraft 100 in which all of the power systems are constructed as the electric systems, hydraulic pipes in the hydraulic system 40, breed air pipes in the breed air system 50, etc., are not provided, and only the electric system 20 is provided. Only one starter/generator 14 is provided in the left engine 11L and the right engine 11R. In a rear portion of the fuselage, a fuel cell 19 is provided instead of the APU 12.

Actuators of a nose landing gear 402, main landing gears 403, main wing control surfaces 404, and tail wing control surfaces 405, or the like, are driven by driving motors which are supplied with the electric power from the electric system 20. The de-icing device 502 is constituted by an electric heater, the air-conditioning pressure application device 503 is constituted by an air-conditioning device electrically driven, etc. The de-icing device 502 and the air-conditioning pressure application device 503 are supplied with the electric power from the electric system 20. The starter/generator 14 serves as an engine starter of an electric motor type which activates the corresponding one of the left engine 11L and the right engine 11R and serves as an AC power supply for supplying the electric power to the electric system 20 after activating the engine.

As should be understood, the aircraft 100 to which the MEA has been applied, has much simpler power systems than the hydraulic system 40 and the breed air system 50 of the general aircraft 900 including. The breed air system 50 generates a great energy loss. By replacing the breed air system 50 with the electric system 20, energy saving is achieved, and a fuel efficiency is improved. In the general aircraft 900, for the maintenance, for each of the electric system 20, the hydraulic system 40 and the breed air system 50, a power supply car, a hydraulic source car and an air/breed air source car are needed. However, in the aircraft 100, maintenance can be carried out only by using the power supply car. Moreover, in the aircraft 100, hydraulic pipes and breed air pipes become unnecessary, which can reduce manufacturing cost.

The stabilizing system of the present embodiment can be suitably applied to the aircraft 100 as shown in FIG. 1A to which the MEA is applied. Also, the stabilizing system of the present embodiment can be suitably applied to an aircraft in which at least either one of the hydraulic system 40 and the breed air system 50 is electrified, or an aircraft in which only a portion of the hydraulic system or the breed air system is electrified, in addition to the aircraft 100 in which all of the power systems are electrified.

[Overall Configuration of Electric System Stabilizing System for Aircraft]

Next, an exemplary overall configuration of the stabilizing system according to Embodiment 1 of the present invention will be described specifically with reference to FIG. 2. Although the aircraft 100 of FIG. 1A is configured to include the fuel cell 19 as a power supply device, a case where the aircraft 100 includes general APU 12 will be described in the embodiments below.

Initially, the power supply devices incorporated into the aircraft 100 to which the stabilizing system of the present embodiment is applied will be described. As shown in FIG. 2, the aircraft 100 includes as the power supply devices, the left engine 11L, the right engine 11R, the auxiliary power unit (APU) 12 and the ram air turbine (RAT) 17. The left engine 11L and the right engine 11R are propulsive engines of the aircraft. The left engine 11L includes starter/generators 141L, 142L, while the right engine 11R includes starter/generators 141R, 142R. In the present embodiment, thus, two AC power generators are provided for each of the left engine 11L and the right engine 11R.

The APU 12 is an auxiliary power source provided separately from the engines 11L, 11R. The APU 12 is actuated by combustion of a fuel like the engines 11L, 11R. The APU 12 also includes APU starter/generators 121, 122, as AC power generators. The RAT 17 is an auxiliary power source provided separately from the APU 12. The RAT 17 is stored in the interior of the aircraft 100 during a normal state and is deployed outside the aircraft 100 in emergencies, etc. The RAT 17 deployed outside the aircraft 100 is actuated by an air flow (flight wind) generated by the flight of the aircraft 100. The RAT 17 includes a RAT generator 171 as an AC power generator.

The APU 12 is used to activate the left engine 11L and the right engine 11R as described later in addition to the use as the power source in emergencies. By comparison, the RAT 17 is fundamentally a power source in emergencies, and is configured to supply necessary and minimum electric power to enable the aircraft 100 to fly in safety in emergencies.

Figure 2:
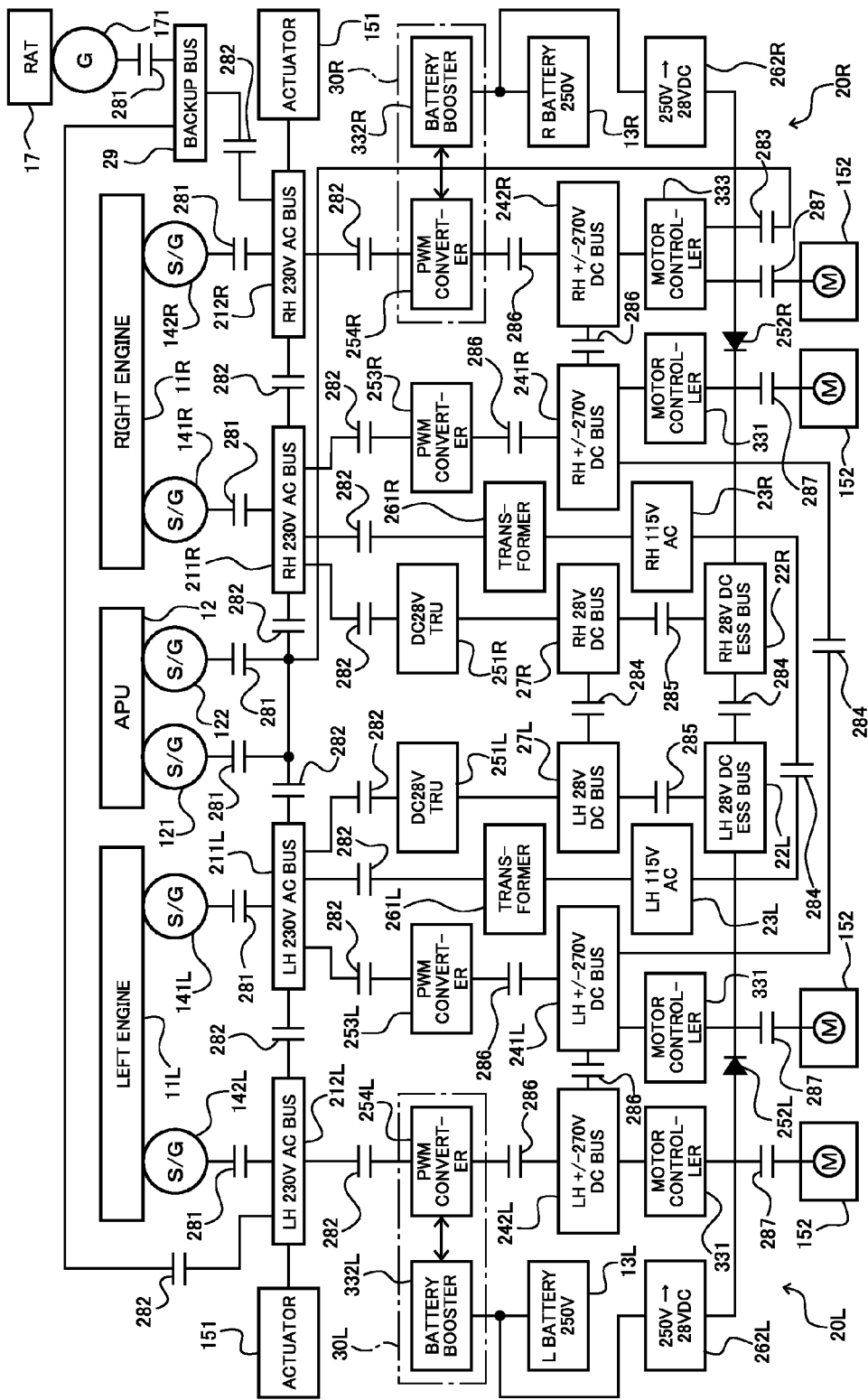
FIG. 2 is a schematic block diagram showing an exemplary configuration of an electric system stabilizing system for an aircraft according to Embodiment 1 of the present invention.

As shown in FIG. 2, the stabilizing system of the present embodiment includes at least, a left electric system 20L, a right electric system 20R, an AC power stabilizing device 30L included in the left electric system 20L, a secondary battery 13L included in the left electric system 20L, an AC power stabilizing device 30R included in the right electric system 20R, and a secondary battery 13R included in the right electric system 20R.

The left electric system 20L includes as the power supply devices, the first starter/generator 141L and the second starter/generator 142L which are mounted to the left engine 11L, and the secondary battery 13L. The right electric system 20R includes as the power supply devices, the first starter/generator 141R and the second starter/generator 142R which are mounted to the right engine 11R, and the secondary battery 13R.

The APU 12 is provided as a power unit separately from propulsive engines. The APU 12 includes the first APU starter/generator 121 and the second APU starter/generator 122 which are AC power generators. The RAT 17 is provided as a power device in emergencies. The RAT 17 includes a RAT generator 171. These generators are connected to both of the left electric system 20L and the right electric system 20R. Specifically, as shown in FIG. 2, the first APU starter/generator 121 and the second APU starter/generator 122 are directly connectable to the left electric system 20L and to the right electric system 20R. As shown in FIG. 2, the RAT generator 171 is directly connectable to the left electric system 20L and the right electric system 20R via a backup bus 29. Therefore, the first APU starter/generator 121, the second APU starter/generator 122, and the RAT generator 171 are power supply devices corresponding to both of the left electric system 20L and the right electric system 20R.

Therefore, in the present embodiment, each of the left electric system 20L and the right electric system 20R includes six power supply devices which are five AC power supplies and one DC power supply. Note that in the present embodiment, the first APU starter/generator 121 and the second APU starter/generator 122 of the APU 12 serve as starters of the APU 12. The first starter/generators 141L, 141R and the second starter/generators 142L, 142R perform starting of the left engine 11L and the right engine 11R, by utilizing the electric power generated in the first APU starter/generator 121 and the second APU starter/generator 122.

The configuration of the left electric system 20L, of the two electric systems, will now be described. The first starter/generator 141L in the left electric system 20L is connected to a first primary AC power supply bus (first primary AC bus) 211L via a primary power supply relay 281. The first primary AC bus 211L is connected to the APU starter/generators 121, 122, a transformer/rectifier (TRU) 251L, a transformer 261L, a first PWM converter 253L and a second primary AC power supply bus (second primary AC bus) 212L via secondary power supply relays 282, respectively.

The second starter/generator 142L is connected to the second primary AC bus 212L via the primary power supply relay 281. The second primary AC bus 212L is connectable to the first primary AC bus 211L via the secondary power supply relay 282 and to the second PWM converter 254L via the secondary power supply relay 282. The second primary AC bus 212L is also connected to the actuator 151 for controlling the control surface (hereinafter simply referred to as "control surface actuator 151").

Therefore, the first starter/generator 141L is able to supply AC power to the TRU 251L, the transformer 261L, the first PWM converter 253L, and the second primary AC bus 212L, via the first primary AC bus 211L. The second starter/generator 142L is able to supply AC power to the first primary AC bus 211L, the second PWM converter 254L, and the control surface actuator 151 via the second primary AC bus 212L.

The first APU starter/generator 121 and the second APU starter/generator 122 are connected to the first primary AC bus 211L via the primary power supply relay 281 and the secondary power supply relay 282, respectively. The RAT generator 171 is connected to the backup bus 29 via the primary power supply relay 281. The backup bus 29 is connected to the second primary AC bus 212L via the secondary power supply relay 282.

Therefore, the first primary AC bus 211L is supplied with the AC power from the first APU starter/generator 121 and the second APU starter/generator 122 as well as from the first starter/generator 141L. Further, the first primary AC bus 211L is supplied with the AC power from the second starter/generator 142L via the second primary AC bus 212L. Likewise, the second primary AC bus 212L is supplied with the AC power from the first starter/generator 141L, the first APU starter/generator 121 and the second APU starter/generator 122 as well as from the second starter/generator 142L. Further, the second primary AC bus 212L is supplied with the AC power from the RAT generator 171.

The TRU 251L connected to the first primary AC bus 211L is connected to the DC power supply bus (DC bus) 27L, which is connected to an essential bus 22L via a DC power supply switch relay 285. The transformer 261L connected to the first primary AC bus 211L is connected to the secondary AC power supply bus (secondary AC bus) 23L. The first PWM converter 253L is connected to the first DC power supply bus (first DC bus) 241L via a DC bus switch relay 286. The first DC bus 241L is connected to a power load 152 including a driving motor (M) via a motor controller 331 and a motor switch relay 287.

The power load 152 is the power load 15 other than the control surface actuator 151, for example, a large-sized electric motor such as the hydraulic pump or the air-conditioning compressor, and its kind or the like is not particularly limited. In the present embodiment, the "power load 15" includes all electrified devices. The power load 152 refers to large-sized electric motors other than the control surface actuator 151. Therefore, for easier description, "power load 152" will also be referred to as "other power load 152."

The second PWM converter 254L connected to the second primary AC bus 212L is connected to the second DC bus 242L via the DC bus switch relay 286 like the first PWM converter 253L. The second DC bus 242L is connected to the other power load 152 via the motor controller 331 and the motor switch relay 287. The second PWM converter 254L is bidirectionally connected to the boost converter 332L, which is connected to the secondary battery 13L. The second PWM converter 254L and the boost converter 332L constitute a portion of the AC power stabilizing device 30L (described later) as surrounded by one-dotted line.

The secondary battery 13L is connected to the essential bus 22L via the voltage converter 262L and the rectifier element 252L. As described above, the essential bus 22L is connected to the first primary AC bus 211L via the DC bus 27L and the TRU 251L. Therefore, the essential bus 22L can be supplied with the electric power from the secondary battery 13L which is the DC power supply as well as the AC power supplies (first starter/generator 141L, second starter/generator 142L, APU starter/generators 121, 122 and the RAT generator 171).

In the left electric system 20L, the first primary AC bus 211L is connected to the first starter/generator 141L. The first DC bus 241L is connected to the first primary AC bus 211L via the first PWM converter 253L. The other power load 152 is connected to the first DC bus 241L. In the same manner, the second primary AC bus 212L is connected to the second starter/generator 142L. The second DC bus 242L is connected to the second primary AC bus 212L via the second PWM converter 254L. The other power load 152 is connected to the second DC bus 242L.

Therefore, the left electric system 20L is constructed as two lower systems which are a lower electric system from the first starter/generator 141L to the first primary AC bus 211L and a lower electric system from the second starter/generator 142L to the second primary AC bus 212L. Assuming that the lower electric system is expressed as "lower system" for easier description, the lower system connected to the first primary AC bus 211L can be expressed as "first lower system," while the lower system connected to the second primary AC bus 212L can be expressed as "second lower system."

The first lower system and the second lower system in the left electric system 20L are connectable together in such a manner that the primary AC buses 211L, 212L are connectable via the secondary power supply relay 282, and the DC buses 241L, 242L are connectable together via the DC bus switch relay 286. Therefore, the left electric system 20L constructs a double redundancy system.

The right electric system 20R which is the other electric system is, as shown in FIG. 2, the same as that of the left electric system 20L. That is, the right electric system 20R includes as the power supply devices, the first starter/generator 141R, the second starter/generator 142R, and the secondary battery 13R, and shares the first APU starter/generator 121, the second APU starter/generator 122 and the RAT generator 171 with the left electric system 20L. The right electric system 20R includes the first primary AC bus 211R, the second primary AC bus 212R, the DC bus 27R, the essential bus 22R, the secondary AC bus 23R, the first DC bus 241R, and the second DC bus 242R as the power supply buses, the TRU 251R, the rectifier element 252R, the first PWM converter 253R, the second PWM converter 254R, the transformer 261R, the voltage converter 262R and the boost converter 332R as the rectifiers and the transformers.

The first starter/generator 141R is connected to the first primary AC bus 211R via the primary power supply relay 281. The APU starter/generators 121, 122 are connected to the first primary AC bus 211R via the secondary power supply relay 282 and the primary power supply relay 281, respectively. The first primary AC bus 211R is connected to the second primary AC bus 212R via the secondary power supply relay 282.

The second primary AC bus 212R is connected to the second starter/generator 142R via the primary power supply relay 281 and to the first primary AC bus 211R via the secondary power supply relay 282. The second primary AC bus 212R is connectable to the RAT generator 171 via the secondary power supply relay 282, the backup bus 29 and the primary power supply relay 281.

Like the left electric system 20L, the first primary AC bus 211R and the second primary AC bus 212R are connected to the TRU 251R, the transformer 261R, the PWM converters 253R, 254R, or the control surface actuator 151, etc., via the secondary power supply relays 282. The PWM converters 253R, 254R are connected to the first DC bus 241R and the second DC bus 242R via the DC bus switch relays 286, respectively. The DC buses 241R, 242R are connected to the power loads 152 via the motor controllers 331, 333 and the motor switch relays 287. The TRU 251R is connected to the DC bus 27R. The DC bus 27R is connected to the essential bus 22R via the DC power supply switch relay 285. The transformer 261R is connected to the secondary AC bus 23R.

As should be appreciated from the above, like the left electric system 20L, the right electric system 20R is constructed as two lower systems which are a first lower system from the first starter/generator 141R to the first primary AC bus 211R and a second lower system from the second starter/generator 142R to the second primary AC bus 212R. As described later, the motor controller 333 connected to the second DC bus 242R is connected to the other power load 152 via a motor switch relay 287 and connected to the APU starter/generators 121, 122, and the first primary AC buses 211L, 211R via starting switch relays 283. No further description of the right electric system 20R will be given.

The left electric system 20L and the right electric system 20R are configured in such a manner that the essential buses 22L, 22R are connected together via a right-left connection relay 284, the secondary AC buses 23L, 23R are connected together via a right-left connection relay 284, and the first DC buses 241L, 241R are connected together via a right-left connection relay 284. Furthermore, the first primary AC buses 211L, 211R are connected together via secondary power supply relays 282 and connected to the APU starter/generators 121, 122 via secondary power supply relays 282.

Each of the left electric system 20L and the right electric system 20R is operative independently as the electric system. If power generation in one of the electric systems stops, the electric power can be supplied to the other electric system by switching of the right-left connection relays 284 present between the power supply buses.

Thus, the left electric system 20L and the right electric system 20R are configured such that their first lower systems are connected together. The electric power can be supplied from the starter/generator 141L, 142L which is the AC power supply in the left electric system 20L to the right electric system 20R, and the electric power can be supplied from the secondary battery 13L which is the DC power supply in the left electric system 20L to the right electric system 20R. The electric power can be supplied from the right electric system 20R to the left electric system 20L in the same manner. Since the APU starter/generators 121, 122 and the RAT generator 171 are connected to both of the left electric system 20L and the right electric system 20R, they are able to supply the electric power to both of the left electric system 20L and the right electric system 20R.

In the present embodiment, the electric systems 20L, 20R are connected together via the power supply buses. Thus, as the electric system in the aircraft 100, a double redundancy system in which the electric systems 20L, 20R are connected together is constructed. Moreover, each of the electric systems 20L, 20R is constructed by the first lower system and the second lower system. The lower systems are connected together, thereby constructing substantially quadplex redundant systems. In this construction, so long as any one of the electric systems is able to supply electric power, the entire electric system can be maintained. This can further improve reliability of the electric systems. Since the right-left connection relays 284 (two secondary power supply relays 282 between the first primary AC buses 211L, 211R) are present between the first electric systems 20L, 20R, the electric systems 20L, 20R are not always electrically connected together.

The secondary batteries 13L, 13R are connected to the second lower systems of the electric systems 20L, 20R. The AC power stabilizing devices 30L, 30R surrounded by one-dotted lines in FIG. 2 are included in the second lower systems, respectively. Therefore, the second lower systems in which a great change in the electric power occurs, due to the fact that the control surface actuators 151 are connected to the second lower systems, can be stabilized. This will be described later.

As described above, the electric system 20L includes the first PWM converter 253L, the second PWM converter 254L and the boost converter 332L, while the electric system 20R includes the first PWM converter 253R, the second PWM converter 254R and the boost converter 332R. Therefore, in the electric systems 20L, 20R, an area in which AC flows and an area in which DC flows are defined. When the former area is referred to as "AC area" and the latter area is referred to as "DC area", the first primary AC buses 211L, 211R and the second primary AC buses 212L, 212R are power supply buses in the AC area, while the second DC buses 242L, 242R and the first DC buses 241L, 241R are power supply buses in the DC area. Between the AC area and the DC area, the DC bus switch relays 286 are present.

A basic path through which the electric power is supplied from the AC power supply in each of the electric systems 20L, 20R having the above configuration will be described in brief. All of three-phase AC power (referred to as "normal AC power" for easier description) from the first starter/generators 141L, 141R, the second starter/generators 142L, 142R, or the APU starter/generators 121, 122 is supplied to the primary AC buses 211L, 212L, 211R, 212R. Therefore, the normal AC power is supplied to the power loads 15 (control surface actuators 151 and other power loads 152) via the primary AC buses 211L, 212L, 211R, 212R.

During a flight of the aircraft 100, if a situation occurs, in which electric power cannot be supplied from any of the first starter/generators 141L, 141R, the second starter/generators 142L, 142R, or the APU starter/generators 121, 122, the RAT 17 is activated, and the RAT generator 171 starts generating electric power. Since the RAT generator 171 is connected to the primary AC buses 212L, 212R via the backup bus 29, three-phase AC power (referred to as "RAT AC power" for easier description) generated in the RAT generator 171 is supplied to the primary AC buses 212L, 212R via the backup bus 29.

At this time, the RAT AC power is supplied only to the power loads 15 which are at least required to enable the aircraft 100 to fly in safety, i.e., the control surface actuators 151 and electrified devices connected to the essential buses 22L, 22R. Specifically, the RAT AC power is supplied to the control surface actuators 151 via the second primary AC buses 212L, 212R. As described later, the RAT AC power is supplied to the AC power stabilizing devices 30L, 30R, via the second primary AC buses 212L, 212R, converted into the DC power by the AC power stabilizing devices 30L, 30R, and supplied to the essential buses 22L, 22R by way of the voltage converters 262L, 262R and the rectifier elements 252L, 252R.

At this time, the RAT AC power is not supplied to, for example, the other power loads 152. Therefore, the DC bus switch relays 286 present between the second PWM converters 254L, 254R constituting the AC power stabilizing devices 30L, 30R and the second DC buses 242L, 242R are switched to a cut-off state, the secondary power supply relays 282 present between the first primary AC buses 211L, 211R and the first PWM converters 253L, 253R are switched to a cut-off state, and the secondary power supply relays 282 present between the second primary AC buses 212L, 212R and the first primary AC buses 211L, 211R are switched to a cut-off state. In this way, the RAT AC power supplied to the other power loads 152 is cut off.

[Components in Electric System]

Next, the power supply devices, the power supply buses, the rectifiers, the transformers, etc., constituting the electric systems 20L, 20R, will be described specifically. As described above, the starter/generators 141L, 142L, 141R, 142R which are one AC power supplies among the power supply devices are provided in the left engine 11L and the right engine 11R, and generate three-phase AC power. The voltage and frequency of the three-phase AC power are not particularly limited. In the present embodiment, the voltage is 230 VAC and the frequency is a variable frequency (VF) of 360~800 Hz. Or, the voltage may be 115 VAC and the frequency may be 360~800 HzVF. One of the starter/generators 141L, 142L and one of the starter/generators 141R, 142R have a voltage of 230 VAC or 115 VAC and a constant frequency (CF) of AC 400 Hz. When the voltage of the starter/generators 141L, 142L, 141R, 142R is 115 VAC, the transformers 261L, 261R, shown in FIG. 1, may be omitted.

The APU starter/generators 121, 122 which are one of the AC power supplies, is mounted to a micro gas turbine (not shown) included in the APU 12 and generates three-phase AC power like the starter/generators 141L, 142L, 141R, 142R. The micro gas turbine is constructed such that a turbine and a compressor are coupled together coaxially, and the APU starter/generators 121, 122 are attached to a compressor shaft. The three-phase AC power generated in the APU starter/generator 121, 122 may be, in the present embodiment, 230 VAC in voltage and 400 HzCF in frequency, or may be 115 VAC in voltage and 400 HzCF in frequency.

The RAT generator 171 which is an AC power supply in emergencies is an AC power generator which generates electric power by rotation of a propeller of the RAT 17. The RAT generator 171 is configured to generate necessary and minimum three-phase AC power to enable the aircraft 100 to fly in safety. The backup bus 29 connected to the RAT generator 171 is provided to supply the three-phase AC power from the RAT generator 171 to the second primary AC buses 212L, 212R.

In the present embodiment, the primary AC buses 211L, 212L, 211R, 212R are power supply buses in which its rated voltage is 230 VAC. The primary AC buses 211L, 212L, 211R, 212R are provided to supply the three-phase AC power from the starter/generators 141L, 142L, 141R, 142R, the APU starter/generators 121, 122, or the RAT generator 171, to the left electric system 20L and to the right electric system 20R. As described above, the control surface actuators 151 are connected to the primary AC buses 212L, 212R.

The TRUs 251L, 251R convert the electric power of 230 VAC from the first primary AC buses 211L, 211R into electric power of 28 VDC. The DC buses 27L, 27R are power supply buses used to supply the electric power of 28 VDC obtained by conversion by the TRUs 251L, 251R, to the essential buses 22L, 22R. In the present embodiment, the essential buses 22L, 22R are power supply buses in which its rated current is 28 VDC. The essential buses 22L, 22R are used to supply the electric power of 28 VDC obtained by conversion in the TRUs 251L, 251R, to control systems which are important in manipulation of the aircraft 100 (e.g., display device or control device, etc., which are important in manipulation of the aircraft 100).

The transformers 261L, 261R decrease the voltage of the AC power of AC230V from the first primary AC buses 211L, 211R to 115 VAC. The secondary AC buses 23L, 23R are used to supply the electric power of 115 VAC obtained by voltage decrease in the transformers 261L, 261R, to the electrified devices or electronic devices which are incorporated into the aircraft 100.

The AC power stabilizing device 30L is interposed between the AC power supply (starter/generator 141L, 142L) and the secondary battery 13L to regulate a voltage of the second primary AC bus 212L, thereby stabilizing the second primary AC bus 212L. The AC power stabilizing device 30R is interposed between the AC power supply (starter/generator 141R, 142R) and the secondary battery 13R to regulate a voltage of the second primary AC bus 212R, thereby stabilizing the second primary AC bus 212R. The specific configuration of the AC power stabilizing devices 30L, 30R will be described later, along with the boost converters 332L, 332R in the AC power stabilizing devices 30L, 30R. The secondary batteries 13L, 13R are DC power supplies of the electric systems 20L, 20R, respectively. In the present embodiment, the secondary batteries 13L, 13R have a rated voltage of 250V and a capacity of 10 AH (Ampere-Hour).

The secondary batteries 13L, 13R are configured to absorb regenerative power from a great power load 15 (e.g., actuator, etc.) and transiently supply electric power to the power loads 15. Specifically, the secondary batteries 13L, 13R may have a rated voltage which allows the regenerative power from the power loads 15 to be absorbed thereinto. In the present embodiment, the rated voltage is 250V as described above, but is not limited to this value. In the present embodiment, the capacity of the secondary batteries 13L, 13R is 10 AH as described above, but is not limited to this value.

For example, as described later, in a conventional general electric system of an aircraft, the rated voltage of the secondary battery is 24 VDC (see secondary battery 913 in FIG. 16) or 28 VDC. By comparison, for example, the rated voltage of the secondary batteries 13L, 13R of the present embodiment is 250V, and is substantially equal to the voltage (230 VAC) of the starter/generators 141L, 142L, 141R, 142R or the voltage of the APU starter/generators 121, 122.

Therefore, preferably, the rated voltage of the DC power supplies (secondary batteries 13L, 13R, capacitors described later, etc.) used in the present embodiment is at least about ten times (specifically, about 8 to 12 times) as great as the rated voltage of a secondary battery of a conventional general aircraft and is at least (specifically, about 0.9 to 1.1 times) as great as the rated voltage of the AC power supplies of the conventional general aircraft. The DC power supplies having such a rated voltage are able to absorb the regenerative power from the power loads and adequately address a voltage decrease (drop) due to overload as described later.

The DC power supplies are not limited to those having such a rated voltage or capacity. DC power supplies having a greater rated voltage or capacity may be used as necessary so long as the DC power supplies are able to absorb the regenerative power from the power loads and transiently supply electric power to the power loads.

The voltage converters 262L, 262R decrease 250 VDC from the secondary batteries 13L, 13R to 28 VDC. The rectifier elements 252L, 252R rectify the electric power of 28 VDC which is the decreased voltage such that the electric power is flowed toward the essential buses 22L, 22R. Therefore, the essential buses 22L, 22R can be supplied with the electric power from the secondary batteries 13L, 13R in the second lower systems, as well as the electric power from the first primary AC buses 211L, 211R in the first lower systems.

The PWM converters 253L, 254L, 253R, 254R connected to the primary AC buses 211L, 212L, 211R, 212R convert the electric power of 230 VAC from the primary AC buses 211L, 212L, 211R, 212R into electric power of +/−270 VDC. In particular, the second PWM converters 254L, 254R in the second lower systems are able to convert the DC power of 250 VDC from the secondary batteries 13L, 13R into the AC power of 230 VAC (of course, the first PWM converters 253L, 253R in the first lower systems may be able to perform DC-AC conversion).

The DC buses 241L, 242L, 241R, 242R connected to the PWM converters 253L, 254L, 253R, 254R supply the converted electric power of +/−270 VDC to the other power loads 152 via the motor controllers 331. The rated voltage of the DC buses 241L, 242L, 241R, 242R is +/−270 VDC. The other power loads 152 include driving motors (expressed as "M" in FIG. 1). By supplying the AC power to the driving motors, the other power loads 152 are actuated.

The primary power supply relays 281, the secondary power supply relays 282, the starting switch relays 283, the right-left connection relays 284, the DC power supply switch relays 285, the DC bus switch relays 286 and the motor switch relays 287 are "relay components" which are configured to suitably perform switching between connection and disconnection of the electric power, in desired locations of the left electric system 20L and the right electric system 20R. Note that these relay components are depicted by symbols of capacitors in FIG. 1.

The primary power supply relays 281 are relay components directly connected to the AC power supplies. The primary power supply relays 281 are in a connected state when the electric power is supplied from the AC power supplies to the primary AC buses 211L, 212L, 211R, 212R, etc., and are in a disconnected state when the electric power is not supplied from the AC power supplies to the primary AC buses 211L, 212L, 211R, 212R, etc. The secondary power supply relays 282 are relay components (except for the primary power supply relays 281) directly connected to the primary AC buses 211L, 212L, 211R, 212R. The secondary power supply relays 282 are in a connected state when the electric power is supplied from the AC power supplies to the components via the primary AC buses 211L, 212L, 211R, 212R, and are in a disconnected state when the electric power is not supplied from the AC power supplies to the components via the primary AC buses 211L, 212L, 211R, 212R.

The starting switch relays 283 are, as described later, in a connected state in the case where the APU starter/generators 121, 122 are activated. This allows the motor controllers 333 to be connected to the APU starter/generators 121, 122 via a path (starting path) which does not include the primary AC buses 211L, 212L, 211R, 212R. The starting switch relays 283 are in a disconnected state in the case where the APU starter/generators 121, 122 are not activated by the motor controllers 333.

As described above, the right-left connection relays 284 are relay components which enable the electric power to be supplied between the left electric system 20L and the right electric system 20R. The right-left connection relays 284 are in the connected state in the case where the electric power is supplied from one of the electric systems 20L, 20R to the other of the electric systems 20L, 20R, and are in the disconnected state in the case where the electric power is not supplied from one of the electric systems 20L, 20R to the other of the electric systems 20L, 20R. In other words, the right-left connection relays 284 are in the disconnected state under the state in which both of the left and right starter/generators 141L, 142L, 141R, 142R are operating normally, and are in the connected state under the state in which only one of the left and right starter/generators 141L, 142L, 141R, 142R is operating normally, the AC power is supplied from the APU starter/generators 121, 122, etc.

The DC power supply switch relays 285 are relay components which allow the DC power supplied from the first primary AC buses 211L, 211R via the TRUs 251L, 251R and the DC buses 27L, 27R to be supplied to the essential buses 22L, 22R. For example, the DC power supply switch relays 285 are in a connected state in a case where the electric power is supplied from the first primary AC buses 211L, 211R via the TRUs 251L, 251R and the DC buses 27L, 27R and are in a disconnected state in a case where the electric power cannot be supplied from the first primary AC buses 211L, 211R to the essential buses 22L, 22R.

The DC bus switch relays 286 are relay components connected to the first DC buses 241L, 241R and the second DC buses 242L, 242R. The DC bus switch relays 286 are in a connected state in the case where the electric power is supplied from the first PWM converters 253L, 253R or the second PWM converters 254L, 254R, and are in a disconnected state in the case where the electric power is not supplied from the first PWM converters 253L, 253R or the second PWM converters 254L, 254R. The DC bus switch relays 286 are in a connected state when electric power communication is performed between the first DC buses 241L, 241R and the second DC buses 242L, 242R (i.e., between the first lower system and the second lower system) and are in a disconnected state when electric power communication is performed between the first DC buses 241L, 241R and the second DC buses 242L, 242R.

The motor switch relays 287 are relay components provided between the motor controllers 331, 333 and the other power loads 152. The motor switch relays 287 are in a connected state in the case where the electric power is supplied to the motors of the power loads 15 and are in a disconnected state in the case where the electric power is not supplied to the motors of the power loads 15.

The specific configuration of the above described power supply devices, power supply buses, rectifiers, transformers, motor controllers, etc., are not particularly limited, but power supply devices, power supply buses, rectifiers, transformers, etc., which are known in the field of the aircraft, may be used, except for special cases. In addition, the power loads 15 (control surface actuators 151 and the other power loads 152) may be known electrified devices incorporated into the aircraft and actuated by the electric power.

[Basic Configuration of AC Power Stabilizing Device]

Next, exemplary basic configuration of the AC power stabilizing devices 30L, 30R connected to the electric systems 20L, 20R, respectively, will be described specifically with reference to FIGS. 3 and 4.

Figure 3:
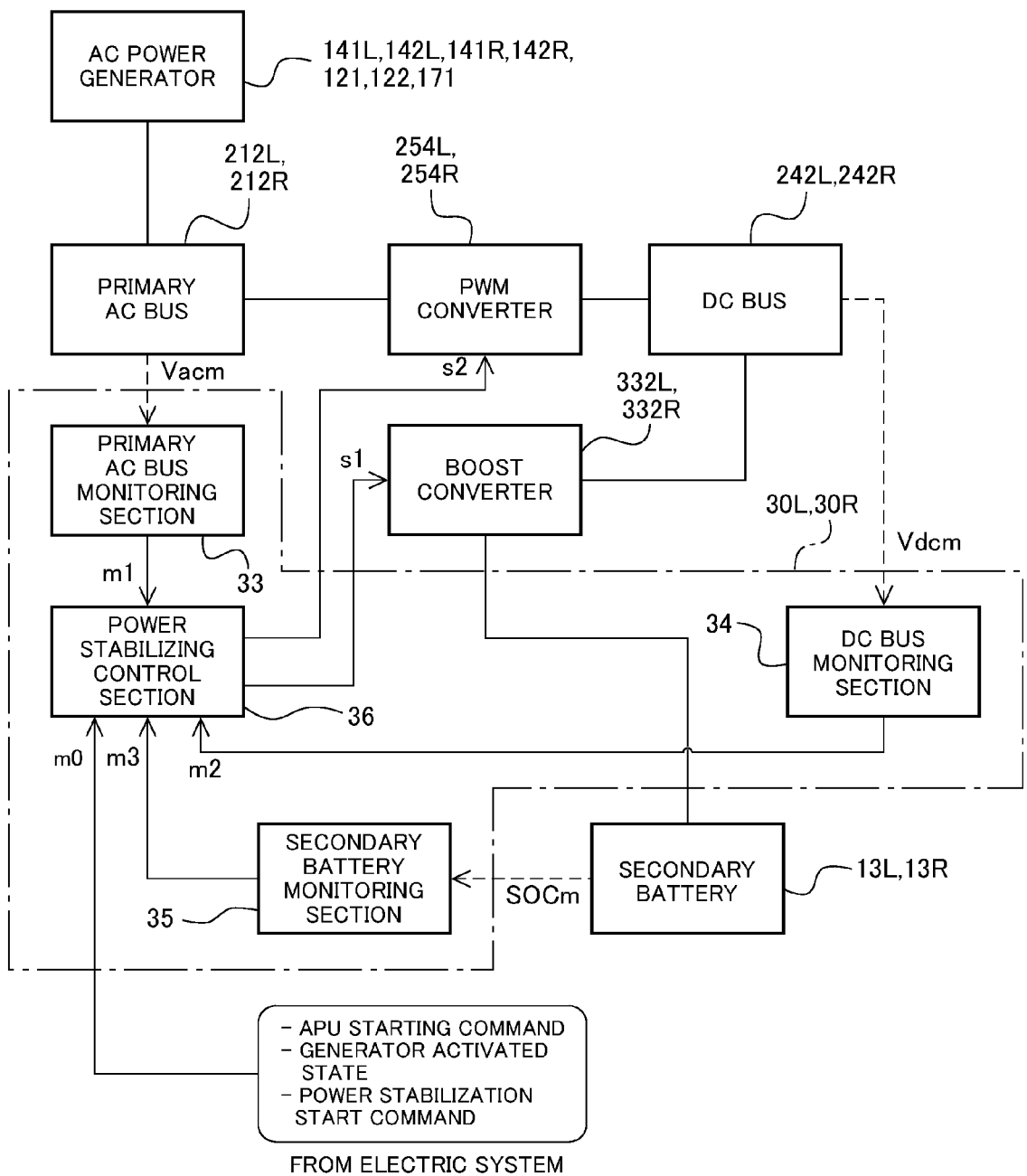
FIG. 3 is a block diagram showing an exemplary schematic configuration of an AC power stabilizing device in the electric system stabilizing system for the aircraft of FIG. 2.

As shown in FIGS. 3 and 4, the AC power stabilizing device 30L, 30R of the present embodiment includes at least a primary AC bus monitoring section 33, a DC bus monitoring section 34, a secondary battery monitoring section 35, and a power stabilizing control section 36, and control the boost converters 332L, 332R and the second PWM converters 254L, 254R. FIG. 3 is a schematic block diagram showing the overall configuration of the AC power stabilizing device 30L, 30R. FIG. 4 is a schematic block diagram showing the configuration of control performed by the power stabilizing control section 36. Therefore, in FIG. 4, for easier description, the primary AC bus monitoring section 33, the DC bus monitoring section 34 and the secondary battery monitoring section 35 shown in FIG. 3 are omitted.

As described above, the second PWM converter 254L, 254R is included in the second lower system of the electric system 20L, 20R and is able to perform mutual conversion between the DC power and the AC power, between the secondary battery 13L, 13R which is the DC power supply and the AC power supply. In this case, the AC power supplies include the first starter/generator 141L, 141R in the first lower system of FIG. 3 or the APU starter/generator 121, 122, as well as the second starter/generator 142L, 142R in the second lower system of FIG. 4. This is because, as described above, the lower systems are connected together to construct a multiple redundancy system.

The second PWM converter 254L, 254R is configured to stabilize the second primary AC bus 212L, 212R in accordance with the control performed by the power stabilizing control section 36. The specific configuration of the second PWM converter 254L, 254R is not particularly limited. In the present embodiment, as shown in FIG. 4, as the second PWM converter 254L, 254R, for example, a PWM converter circuit using, IGBT (Insulated Gate Bipolar Transistor) and an auto transformer (three-phase transformer) for decreasing the voltage is used.

An inverter circuit side of the second PWM converter 254L, 254R is connected to the motor controller 331, 333, while an auto transformer side thereof is connected to the AC power supply such as the second starter/generator 142L, 142R. The auto transformer decreases the voltage, and then the AC power is converted into the DC power, thereby enabling the supply of the DC power corresponding to the rated voltage of +/−270V of the second DC bus 242L, 242R. The first PWM converter 253L, 253R has the same configuration as that of the second PWM converter 254L, 254R.

The boost converter 332L, 332R is connected to the secondary battery 13L, 13R and boosts the DC power from the secondary battery 13L, 13R to supply the DC power to the motor controller 331. In the present embodiment, the DC power supplied to the power load 15 is +/−270 VDC and the DC power from the secondary battery 13L, 13R is 250 VDC. The boost converter 332L, 332R boosts the voltage up to a voltage which is about twice greater. The specific configuration of the boost converter 332L, 332R is not particular limited. In the present embodiment, for example, a bidirectional boost chopper circuit using IGBT is used as the boost converter 332L, 332R. The boost converter 332L, 332R may be omitted if it is not necessary to boost the DC power from the secondary battery 13L, 13R.

The motor controller 331, 333 of FIG. 4 is connected to the second PWM converter 254L, 254R via the second DC bus 242L, 242R (see FIG. 2) and controls the driving motor built in the power load 15. The specific configuration of the motor controller 331, 333 is not particular limited. In the present embodiment, an inverter circuit similar to that of the second PWM converter 254L, 254R is used, as the motor controller 331, 333.

The boost converter 332L and the second PWM converter 254L constitute the power converter section in the electric system 20L, and the boost converter 332R and the second PWM converter 254R constitute the power converter section in the electric system 20R. The power stabilizing control section 36 as described later causes the power converter section to enable mutual conversion between the DC power and the AC power, between the DC power supply (secondary battery 13L, 13R) and the AC power supply (starter/generator 141L, 142L, 141R, 142R, the APU starter/generator 121, 122, and the RAT generator 171). In the present embodiment, the second PWM converter 254L, 254R which is the rectifier in the second lower system, serves as the power converter section in the electric system 20L, 20R.

In the following description, as necessary, the boost converter 332L, 332R and the second PWM converter 254L, 254R are sometimes simply referred to as "power converter section." Although the second PWM converter 254L, 254R is bidirectionally connected to the boost converter 332L, 332R in the example of FIG. 2, they are connected to each other actually via the second DC bus 242L, 242R as shown in FIG. 4.

As shown in FIG. 3, the primary AC bus monitoring section 33 monitors at least one of a change in the voltage and a change in the frequency of the second primary AC bus 212L, 212R, and outputs a measurement voltage value which is a monitoring result (arrow m1 in FIG. 3) to the power stabilizing control section 36. The specific configuration of the primary AC bus monitoring section 33 is not particularly limited, but a known AC power monitoring unit or the like may be suitably used.

As shown in FIG. 3, the DC bus monitoring section 34 monitors a voltage in the second DC bus 242L, 242R connected to the second PWM converter 254L, 254R and outputs a measurement voltage value which is a monitoring result (arrow m2 in FIG. 3) to the power stabilizing control section 36. The specific configuration of the DC bus monitoring section 34 is not particular limited, but a known DC voltage meter or the like may be suitably used.

As shown in FIG. 3, the secondary battery monitoring section 35 monitors the SOC of the secondary battery 13L, 13R and outputs a monitoring result (arrow m3 in FIG. 3) to the power stabilizing control section 36. The specific configuration of the secondary battery monitoring section 35 is not particularly limited, but a known SOC detector capable of detecting the SOC of the secondary battery 13L, 13R may be suitably used.

As the SOC detector, there is known an SOC detector using an integration SOC method which integrates a charging/discharging current, or an instantaneous SOC method which estimates the SOC based on a battery voltage, a battery current, a battery temperature, etc., either of which can be suitably used. In the present embodiment, preferably, the SOC detector configured to make compensation for an accumulated error generated in the integration SOC method by the instantaneous SOC method is used. This makes it possible to suppress the error of SOC from being accumulated even after a long-time use of the SOC detector. Therefore, accurate SOC can be output to the power stabilizing control section 36. As a result, the AC power stabilizing device 30L, 30R can stabilize the electric system 20L, 20R more accurately.

The power stabilizing control section 36 is a controller of the AC power stabilizing device 30L, 30R. As shown in FIG. 3, the primary AC bus monitoring section 33 monitors a voltage and frequency in the second primary AC bus 212L, 212R, the DC bus monitoring section 34 monitors the voltage in the second DC bus 242L, 242R, and controls the power converter section (the boost converter 332L, 332R and the second PWM converter 254L, 254R) based on the voltage and the frequency. Thus, charging/discharging of the secondary battery 13L, 13R which is the DC power supply, is controlled.

In the present embodiment, as described above, the SOC of the secondary battery 13L, 13R, which is monitored by the secondary battery monitoring section 35, is used for the control. In addition to this, as shown in FIG. 3, information indicating an APU starting command, a generator activated state, a power supply stabilization start command, etc., which are obtained in the electric system 20L, 20R, are output (arrow m0 in FIG. 3) to the power stabilizing control section 36 and used to control the power converter section.

The specific configuration of the power stabilizing control section 36 of the present embodiment is not particularly limited. The power stabilizing control section 36 may be configured as a logic circuit including a known switching element, a known subtractor, a known comparator, etc., to generate the above stated power command signal. Or, the power stabilizing control section 36 may be a functional configuration implemented by the operation of a CPU of a microcontroller which is the power stabilizing control section 36, according to programs stored in a memory of the microcontroller.

[Exemplary Configuration of Power Stabilizing Control Section]

Next, an exemplary specific configuration of the power stabilizing control section 36 will be described with reference to FIGS. 5A to 5C, FIG. 6 and FIGS. 7A and 7B.

In the present embodiment, the reference voltage command value of the boost converter 332L, 332R constituting the power converter section is controlled (regulated) so that input of the active power of the second PWM converter 254L, 254R is controlled and input of the reactive power of the second PWM converter 254L, 254R is controlled, thereby stabilizing the second primary AC bus 212L, 212R. In the following description, the direction of the power inputted into the second PWM converter 254L, 254R from the second primary AC bus 212L, 212R refer to the normal direction of the power in FIG. 4.

Figure 5A:
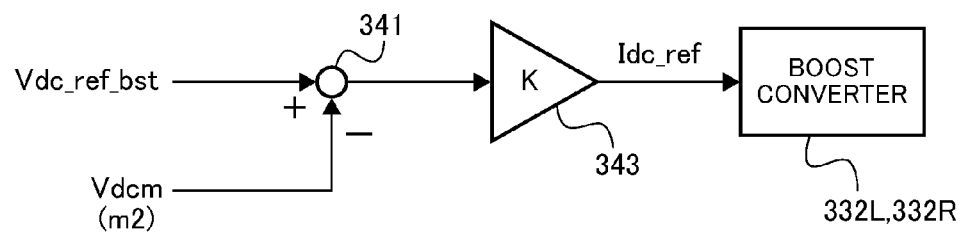
FIG. 5A is a schematic block diagram showing an exemplary boost converter control circuit included in a power stabilizing control section in the AC power stabilizing device of FIG. 3.
Figure 5B:
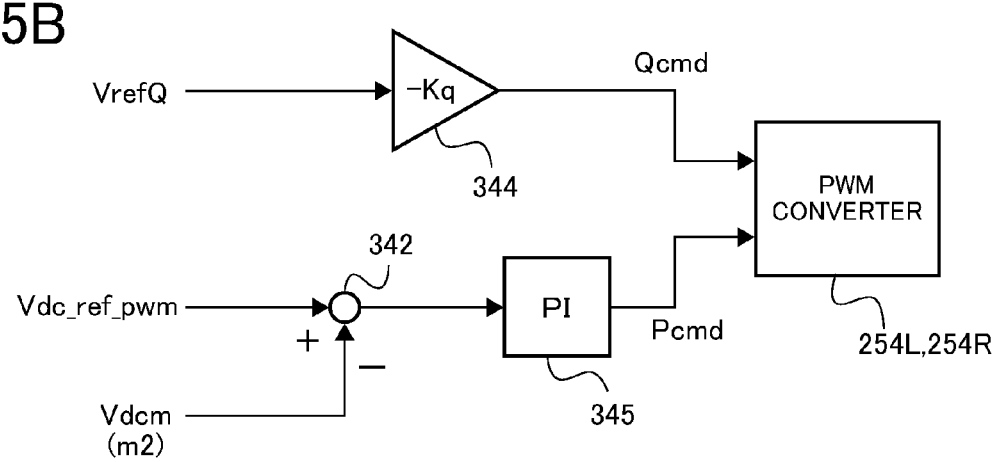
FIG. 5B is a schematic block diagram showing an exemplary PWM converter control circuit included in the power stabilizing control section.
Figure 5C:
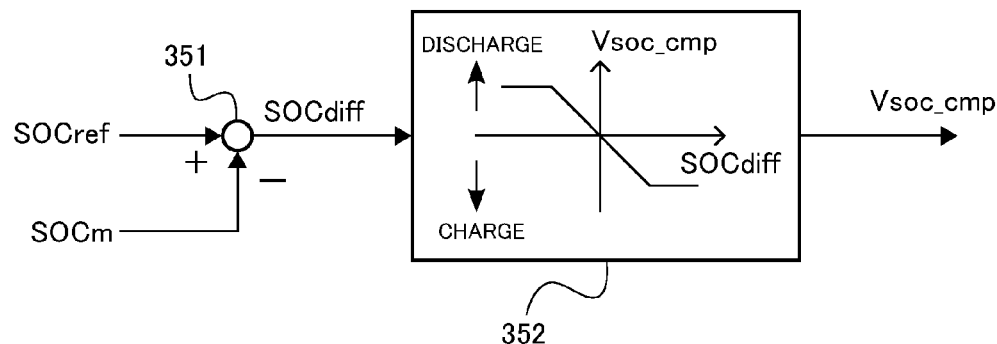
FIG. 5C is a schematic block diagram showing an exemplary SOC compensation circuit included in the power stabilizing control section.

The power stabilizing control section 36 includes a circuit (hereinafter referred to as a boost converter control circuit) for controlling the boost converter 332L, 332R, as shown in FIG. 5A, a circuit (hereinafter referred to as PWM converter control circuit) for controlling the second PWM converter 254L, 254R, as shown in FIG. 5B, and a SOC compensation circuit for making compensation for the SOC of the secondary battery 13L, 13R as shown in FIG. 5C.

Figure 6:
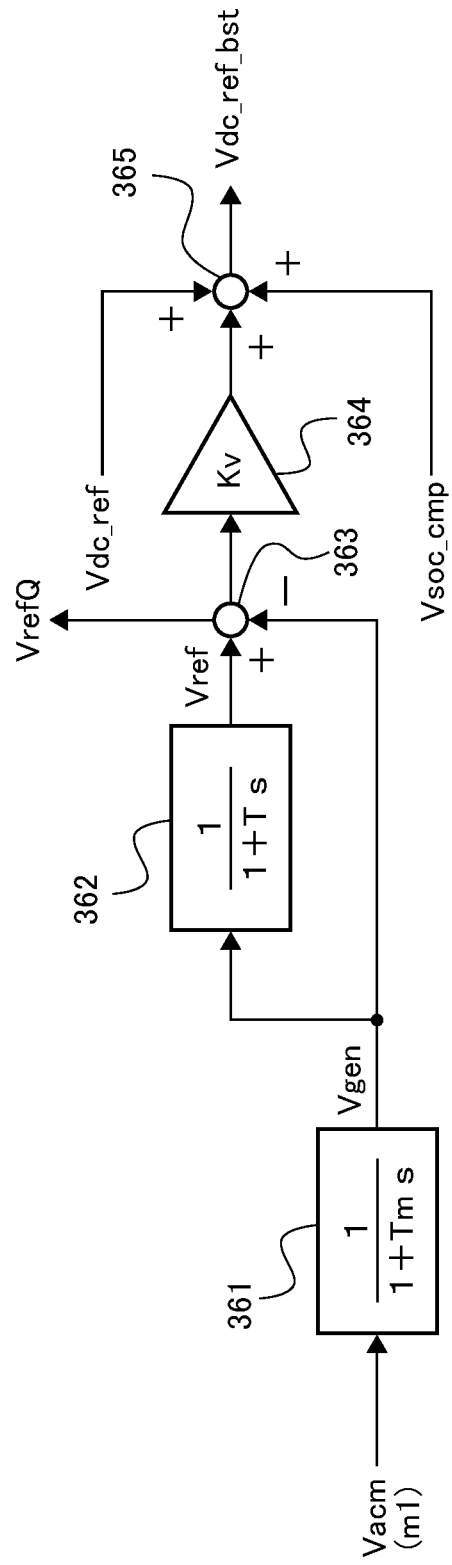
FIG. 6 is a block diagram showing an exemplary reference voltage regulation circuit included in the power stabilizing control section of the AC power stabilizing device of FIG. 3 and an exemplary configuration in a case where the AC power supply has a variable frequency (VF).
Figure 7A:
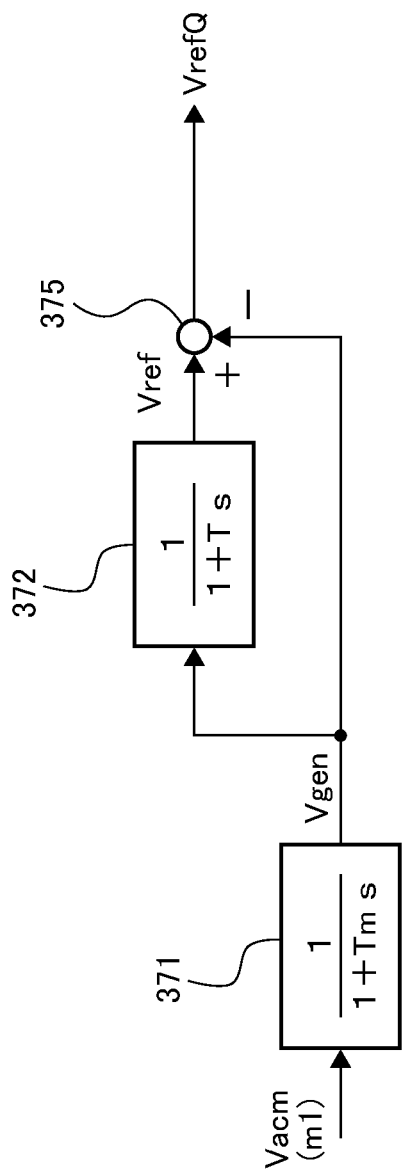
FIGS. 7A and 7B are schematic block diagrams showing an exemplary reference voltage regulation circuit included in the power stabilizing control section of the AC power stabilizing device of FIG. 3 and an exemplary configuration in a case where the AC power supply has a constant frequency (CF).
Figure 7B:
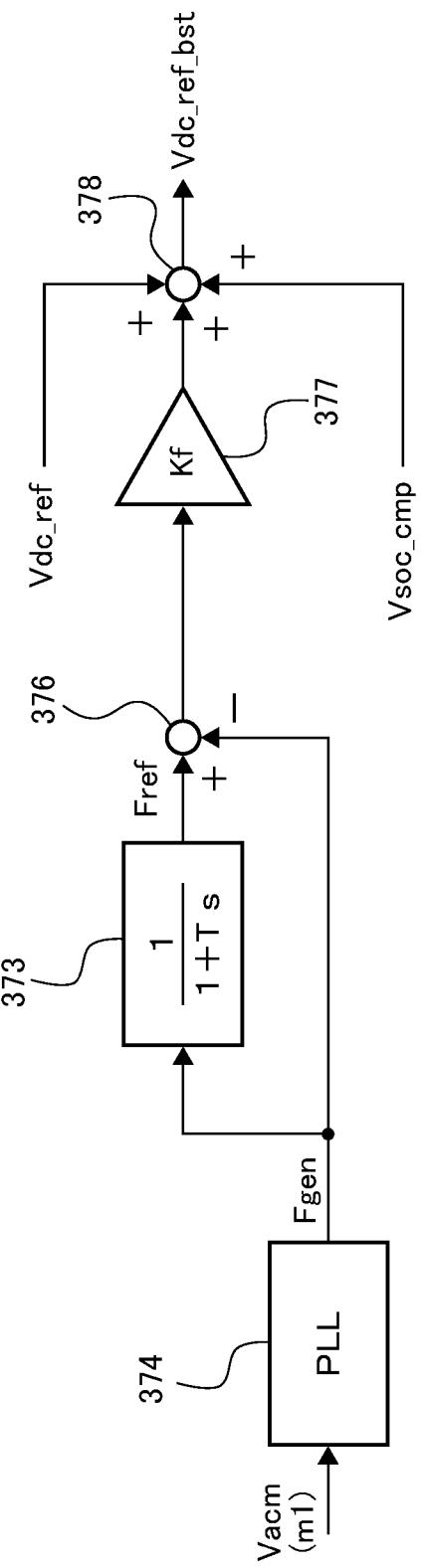

The power stabilizing control section 36 further includes a circuit (hereinafter referred to as reference voltage regulation circuit) for regulating a reference voltage in the boost converter control circuit, as shown in FIG. 6 or FIG. 7A, 7B. The reference voltage regulation circuit of FIG. 6 is a circuit for use in the case where the AC power supply is the generator (VF generator) of a variable frequency (VF). The reference voltage regulation circuit of FIG. 7 is a circuit for use in the case where the AC power supply is the generator (CF generator) of a constant frequency (CF).

As shown in FIG. 5A, the boost converter control circuit includes a first subtractor 341 and a comparator/controller 343. The DC bus monitoring section 34 constituting the AC power stabilizing device 30L, 30R monitors the voltage in the second DC bus 242L, 242R, and outputs to the first subtractor 341 a measurement voltage value Vdcm as a monitoring result m2 as shown in FIG. 5A (see FIG. 3). The first subtractor 341 is applied with as an input a reference voltage command value Vdc_ref_bst from the reference voltage regulation circuit as will be described later. The first subtractor 341 subtracts the measurement voltage value Vdcm from the reference voltage command value Vdc_ref_bst, and outputs the resulting subtraction value (difference (or deviation), Vdc_ref_bst−Vdcm) to the comparator/controller 343.

The comparator/controller 343 is a controller which generates an output current command value Idc_ref used to control the boost converter 332L, 332R. A proportional constant K is preset in the comparator/controller 343. The comparator/controller 343 multiplies the subtraction value from the first subtractor 341 by the proportional constant K to generate the output current command value Idc_ref (=K× (Vdc_ref_bst−Vdcm)), and outputs the output current command value Idc_ref (=K×(Vdc_ref_bst−Vdcm)) to the boost converter 332L, 332R as indicated by arrow s1 in FIGS. 3 and 4.

As shown in FIG. 5B, the PWM converter control circuit includes a comparator/controller 344, a second subtractor 342, and a PI processor 345. As described above, the DC bus monitoring section 34 monitors the voltage in the second DC bus 242L, 242R. As shown in FIG. 5B, the DC bus monitoring section 34 outputs the measurement voltage value Vdcm as a monitoring result m2 to the second subtractor 342 (see FIG. 3).

In the active power control circuit in the PWM converter control circuit, a reference voltage value Vdc_ref_pwm of the second PWM converter 254L, 254R is set. The second subtractor 342 subtracts the measurement voltage value Vdcm from the reference voltage value Vdc_ref_pwm, and outputs the resulting subtraction value (difference, Vdc_ref_pwm−Vdcm) to the PI processor 345. The PI processor 345 performs PI (proportional integral) control on the subtraction value to generate the active power command value Pcmd.

By comparison, in the reference voltage regulation circuit as will be described later, a subtraction value VrefQ of the measurement voltage is generated and output to the comparator/controller 344. The comparator/controller 344 generates a reactive power command value Qcmd which is the value obtained by multiplying the subtraction value VrefQ by the constant−Kq. The calculated active power command value Pcmd and the calculated reactive power command value Qcmd are output to the second PWM converter 254L, 254R.

As shown in FIG. 5C, in the present embodiment, the SOC compensation circuit includes a subtractor 351 and an upper/lower value limiter 352. As shown in FIG. 3, the secondary battery monitoring section 35 constituting the AC power stabilizing device 30L, 30R monitors the SOC of the secondary battery 13L, 13R. As shown in FIG. 5C, the secondary battery monitoring section 35 outputs a measurement value SOCm of SOC which is a monitoring result m3 to the subtractor 351 (see FIG. 4 in addition to FIG. 3). A target value SOCref of SOC is pre-set in the SOC compensation circuit. Therefore, the subtractor 351 compares the target value SOCref to the measurement value SOCm and subtracts the measurement value SOCm from the target value SOCref. The resulting subtraction value SOCdiff (SOCref−SOC) is output to the upper/lower value limiter 352. The upper/lower value limiter 352 generates a compensation voltage value Vsoc_cmp and outputs the compensation voltage value Vsoc_cmp to the reference voltage regulation circuit.

In the case where the AC power supply is the VF generator, as shown in FIG. 6, the reference voltage regulation circuit includes a first lag processor 361, a second lag processor 362, a subtractor 363, a comparator/controller 364 and an adder 365. As shown FIG. 3, the primary AC bus monitoring section 33 constituting the AC power stabilizing device 30L, 30R monitors a voltage in the second primary AC bus 212L, 212R. As shown in FIG. 6, the primary AC bus monitoring section 33 outputs a measurement voltage value Vacm as a monitoring result m1 to the first lag processor 361 (see FIGS. 3 and 4).

The first lag processor 361 indicates a time lag associated with a filter, which occurs in the measurement voltage value Vacm. The first lag processor 361 generates a system voltage value Vgen as the output, and outputs the system voltage value Vgen to the second lag processor 362 and to the subtractor 363. A time constant Tm of the first lag processor 361 is set as a measurement lag time. The second lag processor 362 performs time lag processing on the system voltage value Vgen to generate a system voltage target value Vref, and outputs the system voltage target value Vref to the subtractor 363. The time constant T of the second lag processor 362 can be set suitably, and set to 10 seconds in the present embodiment.

The subtractor 363 subtracts the system voltage value Vgen from the system voltage target value Vref, and outputs the resulting subtraction value VrefQ (difference, Vref−Vgen) to the comparator/controller 364. The subtractor 363 also outputs the generated subtraction value VrefQ to the PWM converter control circuit of FIG. 5B. As described above, the subtraction value VrefQ is used as an input signal used to control the reactive power in the PWM converter control circuit.

The comparator/controller 364 is a controller which generates a reference voltage command value Vdc_ref_bst in the boost converter control circuit. A proportional constant Kv is preset in the comparator/controller 364. The comparator/controller 364 multiplies the subtraction value output from the subtractor 363 by the proportional constant Kv to generate a base value of the reference voltage command value, and outputs the base value (multiplication value) to the adder 365.

In the adder 365, the target value Vdc_ref of the reference voltage is preset. The compensation voltage value Vsoc_cmp generated in the SOC compensation circuit is output to the adder 365. Therefore, the adder 365 adds the target value Vdc_ref and the compensation voltage value Vsoc_cmp to the base value output from the comparator/controller 364 to generate the reference voltage command value Vdc_ref_bst. As described above, the reference voltage command value Vdc_ref_bst is output to the first subtractor 341 in the boost converter control circuit. The reference voltage command value Vdc_ref_bst is used as an input signal used for controlling the active power in the PWM converter control circuit.

By comparison, in the case where the AC power supply is the CF generator, the reference voltage regulation circuit includes a signal generating circuit of FIG. 7A and a signal generating circuit of FIG. 7B. The former is a circuit for generating the input signal used for controlling the reactive power in the PWM converter control circuit and therefore is referred to as a reactive power control signal generating circuit, for easier description. The latter is a circuit for generating the input signal used for controlling the active power in the PWM converter control circuit and therefore is referred to as an active power control signal generating circuit, for easier description.

As shown in FIG. 7A, the reactive power control signal generating circuit includes a first lag processor 371, a second lag processor 372 and a subtractor 375. As shown FIG. 3, the primary AC bus monitoring section 33 monitors the voltage in the second primary AC bus 212L, 212R, and outputs the measurement voltage value Vacm as a monitoring result m1 to the first lag processor 371 as shown in FIG. 7A. The first lag processor 371 indicates a time lag associated with a filter. The first lag processor 371 generates a system voltage value Vgen as the output, and outputs the system voltage value Vgen to the second lag processor 372 and to the subtractor 375.

The second lag processor 372 performs time lag processing on the system voltage value Vgen to generate a system voltage target value Vref, and outputs the system voltage target value Vref to the subtractor 375. The subtractor 375 subtracts the system voltage value Vgen from the system voltage target value Vref to generate the subtraction value VrefQ, and outputs the resulting subtraction value VrefQ to the PWM converter control circuit of FIG. 5B. As described above, the subtraction value VrefQ is used as an input signal used to control the reactive power in the PWM converter control circuit. The time constant Tm of the first lag processor 371 and the time constant T of the second lag processor 372 are identical to those of the reference voltage regulation circuit for the VF generator.

As shown in FIG. 7B, the active power control signal generating circuit includes a third lag processor 373, a PLL processor 374, a subtractor 376, a comparator/controller 377, and an adder 378. The primary AC bus monitoring section 33 outputs the measurement voltage value Vacm (monitoring result m1, see FIG. 3) to the PLL processor 374. The PLL processor 374 performs phase locked loop processing on the measurement voltage value Vacm to generate a system frequency Fgen in the electric system 20L, 20R, and outputs the system frequency Fgen to the third lag processor 373.

The third lag processor 373 is identical in configuration to the second lag processor 372. The third lag processor 373 performs time lag processing on the system frequency Fgen to generate a system frequency target value Fref and outputs the system frequency target value Fref to the subtractor 376. The subtractor 376 subtracts the system frequency Fgen from the system frequency target value Fref and outputs the resulting subtraction value (difference, Fref−Fgen) to the comparator/controller 377.

A proportional constant Kf is preset in the comparator/controller 377. The comparator/controller 377 multiplies the subtraction value by the proportional constant Kf, thereby, generates the base value (the multiplication value) of the reference voltage command value Vdc_ref_bst, and outputs the base value to the adder 378. A target value Vdc_ref of the reference voltage is preset in the adder 378. The compensation voltage value Vsoc_cmp generated in the SOC compensation circuit is output to the adder 378. The adder 378 adds the target value Vdc_ref of the reference voltage and the compensation voltage value Vsoc_cmp to the basic value to generate the reference voltage command value Vdc_ref_bst. The reference voltage command value Vdc_ref_bst is, as described above, output to the first subtractor 341 in the boost converter control circuit. The reference voltage command value Vdc_ref_bst is used as an input signal used for controlling the active power in the PWM converter control circuit.

In the case where the AC power supply is the VF generator and a voltage decrease (drop), occurs in the second primary AC bus 212L, 212R, due to a change in a power load amount, etc., the measurement voltage value Vacm (m1) in the AC area (in the second primary AC bus 212L, 212R) decreases. As a result, in the reference voltage regulation circuit of FIG. 6, the reference voltage command value Vdc_ref_bst (input signal used for controlling the active power) increases. Thereby, in the boost converter control circuit of FIG. 5A, the output current command value Idc_ref becomes a plus value, so that the boost converter 332L, 332R boosts the DC power discharging from the secondary battery 13L, 13R. As a result, the measurement voltage value Vdcm (the voltage in the second DC bus 242L, 242R, m2) increases.

Thereby, in the PWM converter control circuit of FIG. 5B, the active power command value Pcmd becomes minus. The input of the active power (input of real load) from the second primary AC bus 212L, 212R decrease by the second PWM converter 254L, 254R. At this time, the secondary battery 13L, 13R is discharged. By this control, the voltage decrease (drop) in the second primary AC bus 212L, 212R is made up for, and the voltage is stabilized (electric system is stabilized).

When the voltage decrease occurs in the second primary AC bus 212L, 212R, the subtraction value VrefQ of the measurement voltage (input signal used for controlling the active power) in the reference voltage regulation circuit of FIG. 6 becomes plus. Thereby, in the PWM converter control circuit of FIG. 5B, the reactive power command value Qcmd becomes minus, so that the reactive power with a leading power factor is input from the second PWM converter 254L, 254R. By this control, the voltage decrease is suppressed, and the voltage is stabilized (electric system is stabilized).

When the voltage increase occurs in the second primary AC bus 212L, 212R, the power stabilizing control section 36, i.e., the reference voltage regulating circuit (FIG. 6), the boost converter control circuit (see FIG. 5A), and the PWM converter control circuit (see FIG. 5B) perform control which is the reverse of the above mentioned control (control for addressing the voltage decrease). Thereby, the voltage in the second DC bus 242L, 242R and the voltage in the second primary AC bus 212L, 212R are stabilized (electric system is stabilized).

That is, when the voltage in the second primary AC bus 212L, 212R (measurement voltage value Vacm in the AC area) increases, the subtraction value VrefQ of the measurement voltage becomes minus, and the reference voltage command value Vdc_ref_bst decreases, in a reference voltage generating circuit (see FIG. 6). Because of this, in the boost converter control circuit (see FIG. 5A), the output current command value Idc_ref becomes minus, so that the measurement voltage value Vdcm in the DC area decreases.

When the subtraction value VrefQ becomes minus, the reactive power command value Qcmd becomes minus in the PWM converter control circuit (see FIG. 5A). Thereby, the reactive power of a lagging power factor from the second PWM converter 254L, 254R is input to the power converter section. When the measurement voltage value Vdcm in the DC area increases, and thereby the subtraction value Vdc_ref_pwm−Vdcm becomes plus, the active power command value Pcmd becomes plus. As a result, an amount of the active power input from the second primary AC bus 212L, 212R to the second PWM converter 254L, 254R increases. At this time, the secondary battery 13L, 13R is charged, and thus compensation is made for the voltage increase in the second primary AC bus 212L, 212R.

Thus, in the present embodiment, in the case where the VF AC power supply is used and the voltage increase is monitored, the power stabilizing control section 36 causes the power converter section to increase the input of the active power by charging the DC power supply (secondary battery 13L, 13R) in proportion to the voltage increase, to input the reactive power with a lagging power factor in proportion to the voltage increase, or to control the active power described above and to control the reactive power described above. This makes it possible to effectively suppress a temporary voltage increase and suppress the electric power from returning to the AC power supply in the electric system 20L, 20R, as will be described later.

If a voltage decrease is monitored, the power stabilizing control section 36 causes the power converter section to decrease the input of the active power by discharging the DC power supply in proportion to the voltage decrease, to input the reactive power with a leading power factor in proportion to the voltage decrease, or to control the active power described above and to control the reactive power described above. This makes it possible to effectively suppress a temporary voltage decrease from occurring in the electric system 20L, 20R, as will be described later.

In the case where the AC power supply is the CF generator and a power amount in the second primary AC bus 212L, 212R increases, the measurement voltage value Vacm in the AC area decreases, and the system frequency Fgen decreases and as a result the reference voltage command value Vdc_ref_bst increases in the active power control signal generating circuit of FIG. 7B. Thereby, in the boost converter control circuit of FIG. 5A and the PWM converter control circuit of FIG. 5B, in the same manner as the above, the output current command value Idc_ref becomes plus, the measurement voltage value Vdcm (m2) in DC area increases, and the active power command value Pcmd changes to minus Thereby, the input of the active power from the second primary AC bus 212L, 212R decreases by the second PWM converter 254L, 254R (At this time, the secondary battery 13L, 13R is discharged).

When the voltage decreases in the second primary AC bus 212L, 212R, and the measurement voltage value Vacm decreases, the system voltage value Vgen decreases and the subtraction value VrefQ of the measurement voltage becomes plus in the reactive power control signal generating circuit of FIG. 7A. Thereby, in the PWM converter control circuit of FIG. 5B, the reactive power command value Qcmd becomes minus, so that the reactive power with a leading power factor is input from the second PWM converters 254L, 254R.

On the other hand, when the voltage and/or frequency increase occurs in the second primary AC bus 212L, 212R, the power stabilizing control section 36, i.e., the active power control signal generating circuit (see FIG. 7B), the reactive power control signal generating circuit (see FIG. 7A), the boost converter control circuit (see FIG. 5A), and the PWM converter control circuit (see FIG. 5B) perform control which is the reverse of the above mentioned control (control for addressing the voltage and/or frequency decrease).

That is, when the voltage (measurement voltage value Vacm in the AC area) of the second primary AC bus 212L, 212R increases, the system frequency Fgen increases and therefore the reference voltage command value Vdc_ref_bst decreases in an active power control signal generating circuit (see FIG. 7B). Because of this, in the boost converter control circuit (see FIG. 5A), the output current command value Idc_ref becomes minus, and therefore the measurement voltage value Vdcm in the DC area decreases.

In the reactive power control signal generating circuit (see FIG. 7A), the measurement voltage value Vacm (m1) increases, and as a result, the subtraction value VrefQ of the measurement voltage becomes minus. Because of this, in the PWM converter control circuit (see FIG. 5B), the reactive power command value Qcmd becomes plus. Thereby, the reactive power of a lagging power factor from the second PWM converter 254L, 254R is input to the power converter section. When the measurement voltage value Vdcm in the DC area decreases and thereby the subtraction value Vdc_ref pwm−Vdcm becomes plus, the active power command value Pcmd becomes plus. As a result, an amount of the active power input from the second primary AC bus 212L, 212R to the second PWM converter 254L, 254R increases (At this time, the secondary battery 13L, 13R is charged).

As described above, in the case where the AC power supply is the CF generator, the active power is controlled based on the change in the system frequency, or the reactive power is controlled based on the change in the system voltage, thereby stabilizing the voltage and the frequency (stabilizing the electric system).

In the present embodiment, in the case where the AC power supply is the CF generator, if a frequency increase is monitored, the power stabilizing control section 36 causes the power converter section to increase the input of the active power by charging the DC power supply (secondary battery 13L, 13R) in proportion to the frequency increase, while if the voltage increase is monitored, the power stabilizing control section 36 causes the power converter section to input the reactive power with a lagging power factor in proportion to the voltage increase. This makes it possible to effectively suppress a voltage and/or frequency increase due to temporary regenerative power generated in the electric system 20L, 20R, as will be described later.

On the other hand, if the frequency decrease is monitored, the power stabilizing control section 36 causes the power converter section to decrease the input of the active power by discharging the DC power supply in proportion to the frequency decrease, while if the voltage decrease is moni-tored, the power stabilizing control section 36 causes the power converter section to input reactive power with a leading power factor in proportion to the voltage decrease. This makes it possible to effectively suppress a temporary voltage and/or frequency decrease generated in the electric system 20L, 20R, as will be described later.

In the present embodiment, the SOC compensation circuit of FIG. 5C generates the compensation voltage value Vsoc_cmp so that the SOC of the secondary battery 13L, 13R maintains a predetermined value. The compensation voltage value Vsoc_cmp is used to regulate the reference voltage. Therefore, charging/discharging can be adjusted while maintaining the SOC in a substantially constant state.

[Stabilization of Electric System]

Next, exemplary stabilization of the electric system 20L, 20R by the AC power stabilizing device 30L, 30R having the above configuration will be described with reference to FIGS. 8, 9A, 9B, and 10 to 12, in addition to FIGS. 3 and 4. For easier description, in FIGS. 9A, 9B, and 10 to 12, stabilization of the electric system 20L, 20R will be described, for the case of the control surface actuator 151 in which great regenerative power is more likely to occur and for the case of the other power load 152 other than the control surface actuator 151, among the power loads 15.

Figure 8:
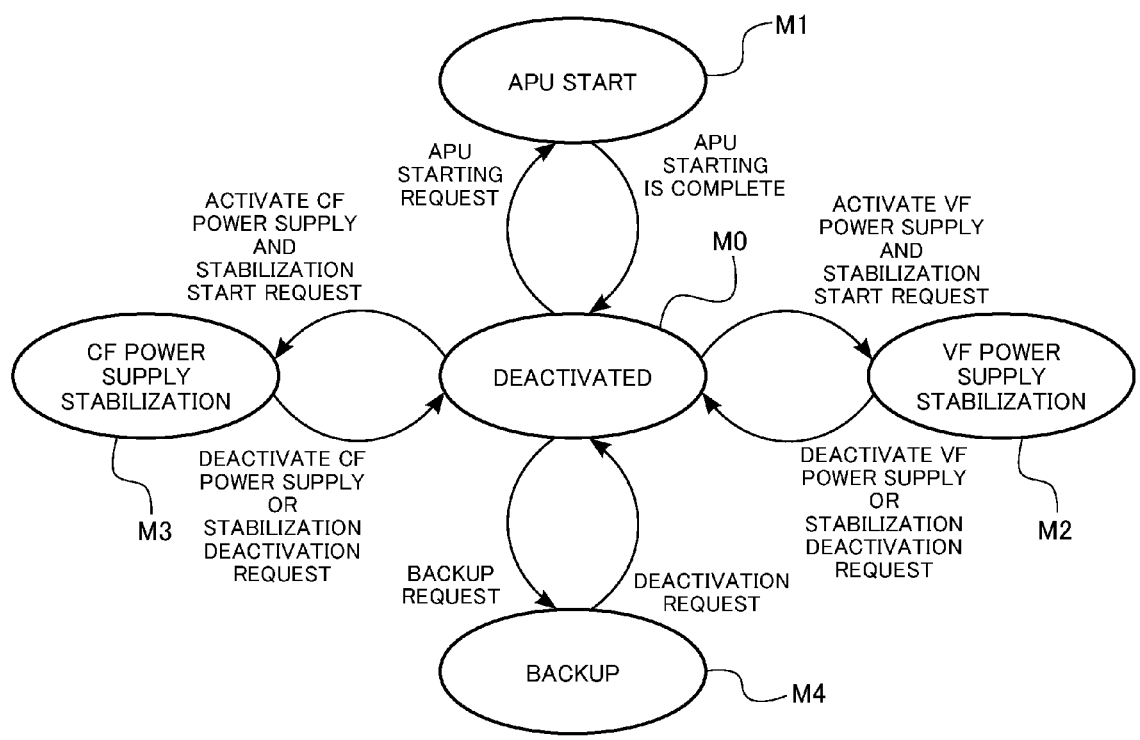
FIG. 8 is a schematic view showing an exemplary state transition under control performed by the AC power stabilizing device in the electric system stabilizing system for the aircraft of FIG. 2.

As shown in FIG. 8, the stabilizing system of the present embodiment is configured to transition among five states including a deactivated state, under control performed by the AC power stabilizing device 30L, 30R. In FIG. 8, a state M0 at the center is the deactivated state. If starting of the APU 12 is requested, the AC power stabilizing device 30L, 30R transitions to a state M1 at an upper side in FIG. 8, an APU starting state, the voltage of the secondary battery 13L, 13R increases by the boost converter 332L, 332R, the voltage is supplied the motor controller 333 via the second DC bus 242R, the motor controller 333 starts the APU 12. When starting of the APU 12 is completed, the stabilizing system returns to the state M0: deactivated state. If backup is requested, the stabilizing system transitions to a state M4 at a lower side in FIG. 8: backup state, while if deactivation of the backup is requested, the stabilizing system returns to the state M0: deactivated state.

When the VF generator included in the starter/generator 141L, 142L, 141R, 142R is activated and starting of stabilization of the electric system 20L, 20R is requested, the stabilizing system transitions to a state M2 at a right side in FIG. 8: a VF power supply stabilization state. When the starter/generator 141L, 142L, 141R, 142R is deactivated or deactivation of stabilization is requested, the stabilizing system returns to the state M0: deactivated state.

In the same manner, when start of stabilization of the electric system 20L, 20R is requested in a state in which the APU starter/generator 121, 122 is supplying electric power as the generator, or the CF generator included in the starter/generator 141L, 142L, 141R, 142R is supplying the electric power, the stabilizing system transitions to a state M3 at a left side in FIG. 8: CF power stabilization state. If the starter/generator 141L, 142L, 141R, 142R is deactivated, or deactivation of stabilization is requested, the stabilizing system returns to the state M0: deactivated state.

It is supposed that start of the stabilization of the second primary AC bus 212L, 212R is requested in the state in which the second primary AC bus 212L, 212R is supplied with the electric power generated by the APU starter/generator 121, 122. In this case, the AC power stabilizing device 30L, 30R is able to perform control so that the electric power in the second primary AC bus 212L, 212R is stabilized.

It is also supposed that during the flight of the aircraft 100, all of the starter/generators 141L, 142L, 141R, 142R stop simultaneously, the RAT 17 is deployed outside the aircraft 100, and the RAT generator 171 supplies the electric power to the second AC bus 212L, 212R. Even when start of the stabilization is requested under this state, the AC power stabilizing device 30L, 30R is able to perform control so that the electric power in the second primary AC bus 212L, 212R is stabilized.

The RAT generator 171 is the VF generator having a variable frequency. When start of the stabilization of the electric system 20L, 20R is requested, the stabilizing system transitions to the state M2: VF power stabilization state. When the RAT generator 171 is deactivated or deactivation of the stabilization is requested, the stabilizing system returns to the state M0: deactivated state. During a period of time from when all of the starter/generators 141L, 142L, 141R, 142R stop simultaneously until the RAT generator 171 starts generating electric power, the stabilizing system returns to the state M4: backup state if the backup is requested. Thereby, for a specified period of time, the electric power is supplied from the secondary battery 13L, 13R to the power loads 15 which are at least required to enable the aircraft 100 to fly in safety. When the deactivation of the backup is requested, the stabilizing system returns to the state M0: deactivated state.

Next, stabilization of the electric system 20L, 20R will be described with reference to the above stated state transition. In the case of starting the APU starter/generator 121, 122, the APU starter/generator 121, 122 is activated by using at least one motor controller 333 included in the electric system 20L, 20R. The motor controller 333 used in this starting is referred to as "starter/motor controller" for easier description. For example, in the present embodiment, as described above, as shown in FIG. 2, the motor controller 333 in the second lower system of the right electric system 20R is "starter/motor controller" and is connectable to the APU starter/generator 121, 122 as well as the other power load 152.

Figure 9A:
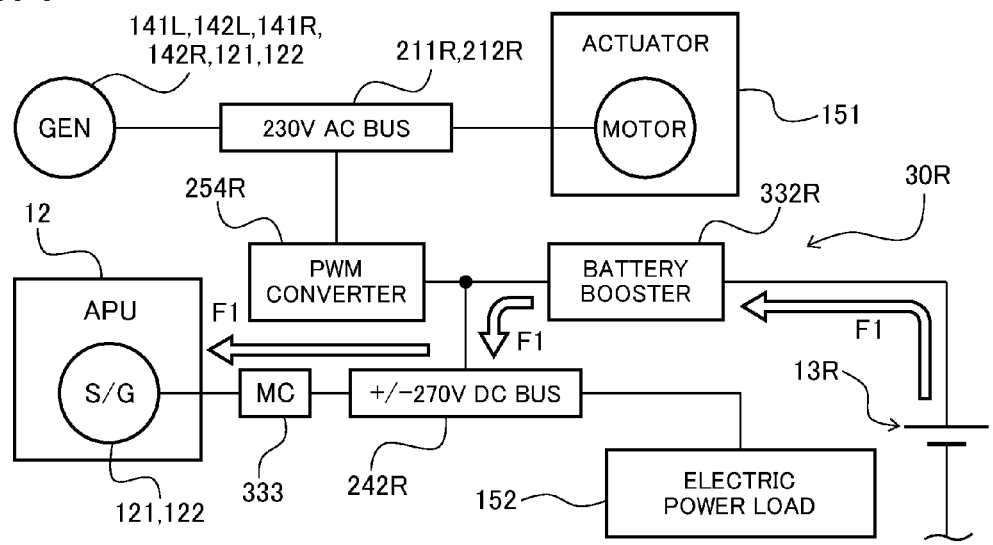
FIG. 9A is a schematic block diagram showing a state in which electric power is supplied from the secondary battery when an auxiliary power unit is starting, in the electric system stabilizing system for the aircraft of FIG. 2.

As indicated by block arrow F1 of FIG. 9A, when the secondary battery 13L, 13R starts discharging the electric power, the discharged electric power is supplied from the boost converter 332R to the APU starter/generator 121, 122 via the second DC bus 242R and the starter/motor controller 333 (see FIG. 2). By control by the starter/motor controller 333, the APU starter/generator 121, 122 is started.

Thus, when the APU 12 is in the deactivated state and starting of the APU 12 is requested, the stabilizing system transitions from the state M0 to the state M1, in which the power stabilizing control section 36 causes the power converter section to boost the DC power from the secondary battery 13L, 13R and supplies the DC power to the starter/motor controller 333. Thus, by control by the starter/motor controller 333, the APU starter/generator 121, 122 is activated, thereby allowing the APU 12 to be activated.

Upon the APU starter/generator 121, 122 being activated, the first starter/generator 141L and the second starter/generator 142L in the left engine 11L and the first starter/generator 141R and the second starter/generator 142R in the right engine 11R are actuated, by the starter/motor controller 333, by the electric power supplied from the APU starter/generator 121, 122. Therefore, the starter/generators 141L, 142L, 141R, 142R start generating the electric power. As indicated by block arrow F2 in FIG. 9B, the three-phase AC power is supplied to the primary AC bus 211L, 212L, 211R, 212R. At this time, the stabilizing system returns from the state M1 of FIG. 8 to the state M0 of FIG. 8. When the starter/generator 141L, 142L, 141R, 142R is activated and start of stabilization is requested, the stabilizing system returns from the state M0 of FIG. 8 to the state M2 of FIG. 8.

Figure 9B:
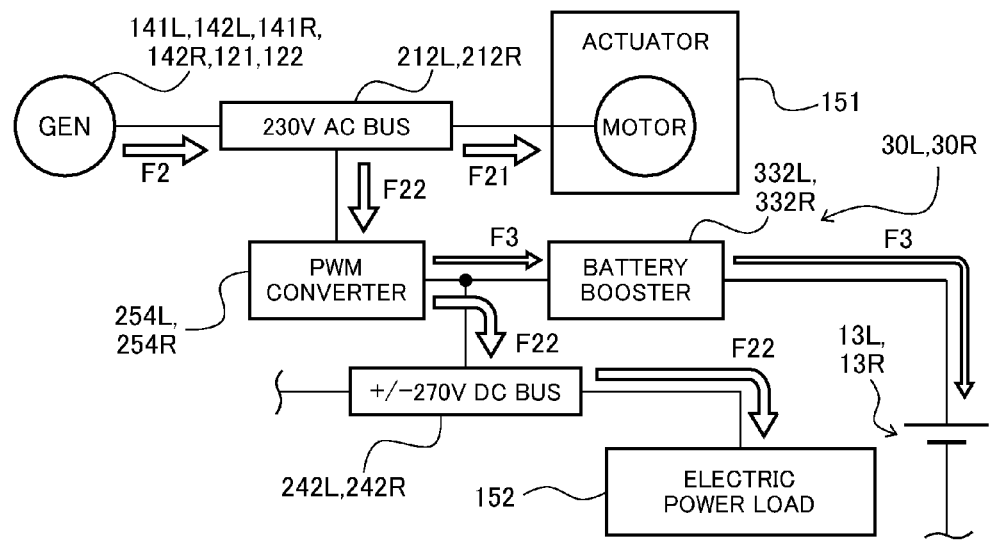
FIG. 9B is a schematic block diagram showing a state in which the electric power is supplied from the starter/generator during a normal state, in the electric system stabilizing system for the aircraft of FIG. 2.

As indicated by block arrow F21 of FIG. 9B, in the case where all of the generators are normal, the electric power is supplied from the generators to the corresponding power supply buses. It is assumed that the control surface actuator 151 is connected to the second primary AC bus 212L, 212R. In this case, as described above, the AC power stabilizing device 30L monitors a voltage in the second primary AC bus 212L, while the AC power stabilizing device 30R monitors a voltage in the second primary AC bus 212R. The first PWM converter 253L backs-up the second PWM converter 254L, while the first PWM converter 253R backs-up the second PWM converter 254R.

The control surface actuator 151 is supplied with the electric power from the second primary AC bus 212L, 212R. As indicated by the block arrow F22, the electric power is supplied to the other power load 152 via the second PWM converter 254L, 254R or via the first PWM converter 253L, 253R (not shown in FIG. 9B).

Furthermore, as indicated by the block arrow F3 of FIG. 9B, the AC power stabilizing device 30L, 30R charges the secondary battery 13L, 13R. Specifically, as shown in FIG. 3, the secondary battery monitoring section 35 in the power stabilizing control section 36 monitors the SOC of the secondary battery 13L, 13R and controls the boost converter 332L, 332R according to a monitoring result (SOC), thereby charging the secondary battery 13L, 13R. In the present embodiment, the power command signal is a gate drive signal for causing a plurality of switching elements (e.g., power semiconductor elements) constituting the boost converter 332L, 332R or the second PWM converter 254L, 254R to be turned ON/OFF.

As shown in FIG. 3 or 4, receiving the power command signal s1, s2 from the power stabilizing control section 36, in the boost converter 332L, 332R or the second PWM converter 254L, 254R, the switching elements in the boost converter 332L, 332R or the second PWM converter 254L, 254R are switched, thereby charging the secondary battery 13L, 13R as indicated by block arrow F3. Thus, in a state in which the secondary battery 13L, 13R is in a chargeable state, the power stabilizing control section 36 causes the power converter section to convert the AC power from the starter/generator 141L, 142L, 141R, 142R into the DC power and supplies the DC power to the secondary battery 13L, 13R, thereby charging the secondary battery 13L, 13R.

The AC power supplied from the starter/generator 141L, 142L, 141R, 142R is mainly supplied to the control surface actuator 151 and the other power load 152. Therefore, in FIG. 9B, the block arrows F2, F21, and F22 indicating electric power supply to the power load 15 are indicated by relatively bold-lines, while the block arrow F3 indicating electric power supply to the secondary battery 13L, 13R for charging is indicated by a relatively thin-line.

Figure 10:
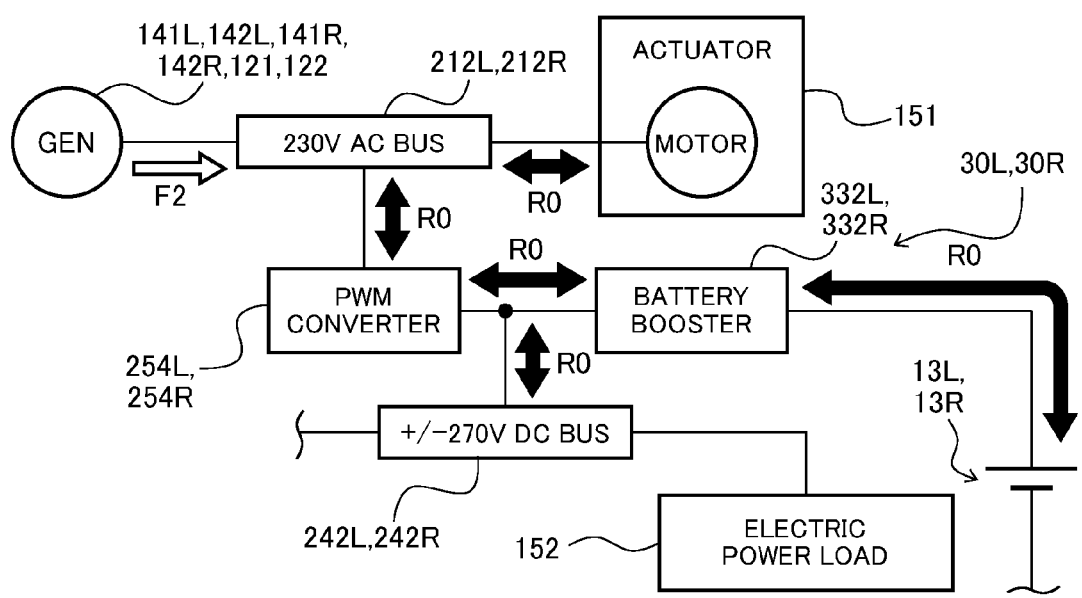
FIG. 10 is a schematic block diagram showing a state in which regenerative power generated in an actuator is absorbed and deficient electric power due to a voltage decrease (drop) is made up for, in the electric system stabilizing system for the aircraft of FIG. 2.

As shown in FIG. 10, it is assumed that great regenerative power occurs in, for example, the control surface actuator 151, or a great power decrease (drop) (overloaded state) occurs in the electric system 20L, 20R because of temporary connection to many power loads 15. The AC power stabilizing device 30L, 30R performs stabilization control in such a manner that, for example, the secondary battery 13L, 13R absorbs the regenerative power or supplies electric power to make up for deficient electric power due to the voltage decrease. In FIG. 10, the regenerative power and make-up electric power are collectively indicated by bidirectional block arrow R0.

Specifically, for example, as indicated by the thin-line arrow m1 in FIGS. 3 and 4, if it is detected that the regenerative power occurs in the second primary AC bus 212L, 212R whose power state is monitored by the primary AC bus monitoring section 33 (not shown in FIG. 4), the power stabilizing control section 36 generates the power command signal s1, s2 and outputs the power command signal s1, s2 to the power converter section so that the electric power is supplied from the second DC bus 242L, 242R to the secondary battery 13L, 13R.

In the boost converter 332L, 332R or the second PWM converter 254L, 254R in the power converter section, the switching elements are switched based on the power command signal. Thereby, the regenerative power which has flowed into the second DC bus 242L, 242R flows toward the secondary battery 13L, 13R as indicated by block arrow R0-3 (the same direction as that of the block arrow F3) in FIG. 4. Since the secondary battery 13L, 13R is configured to have a higher voltage sufficient to absorb the regenerative power, the generated regenerative power can be charged into and thereby favorably absorbed into the secondary battery 13L, 13R.

In the same manner, as indicated by the thin-line arrow m1 of FIGS. 3 and 4, if a significant voltage decrease is detected in the second primary AC bus 212L, 212R whose power state is monitored by the primary AC bus monitoring section 33 (not shown in FIG. 4), the power stabilizing control section 36 generates the power command signal s1, s2 and outputs the power command signal s1, s2 to the power converter section so that the electric power is supplied from the secondary battery 13L, 13R to the second DC bus 242L, 242R.

In the boost converter 332L, 332R or the second PWM converter 254L, 254R in the power converter section, the switching elements are switched based on the power command signal. Thereby, the DC power from the secondary battery 13L, 13R can be supplied to the second DC bus 242L, 242R as indicated by the block arrow R0-4 of FIG. 4. Therefore, even when the starter/generator 141L, 142L, 141R, 142R or the APU starter/generator 121, 122 which is/are supplying the electric power to the second primary AC bus 212L, 212R, is/are in the overloaded state, this overloaded state can be made up for by the electric power supplied from the secondary battery 13L, 13R.

As should be appreciated from the above, in accordance with the present embodiment, the AC power stabilizing device 30L, 30R monitors the voltage in the second primary AC bus 212L, 212R and the voltage in the second DC bus 242L, 242R and controls charging/discharging of the DC power supply (the secondary battery 13L, 13R). Therefore, the significant regenerative power can be absorbed by the DC power supply via the second DC bus 242L, 242R or deficient electric power due to the temporary voltage decrease can be made up for by the electric power supplied from the DC power supply.

As described above, when the voltage increase occurs, the AC power stabilizing device 30L, 30R controls the power converter section (boost converter 332L, 332R and the second PWM converter 254L, 254R) to input the reactive power with a lagging power factor in proportion to the voltage increase. By this control, the voltage increase can be suppressed. In the same manner, when the voltage decrease (drop) occurs, the AC power stabilizing device 30L, 30R controls the power converter section to input the reactive power with a leading power factor in proportion to the voltage decrease. By this control, the voltage decrease can be suppressed.

As a result, for example, it is not necessary to build the resistor into the controller of the control surface actuator 151 to consume the regenerative power by heat generation, or it is not necessary to increase a power generation capacity of the AC power supplies adaptively to a maximum load. Thus, the electric system stabilizing system for the aircraft of the present invention is capable of favorably stabilizing the electric system 20L, 20R while avoiding a weight increase.

Figure 11:
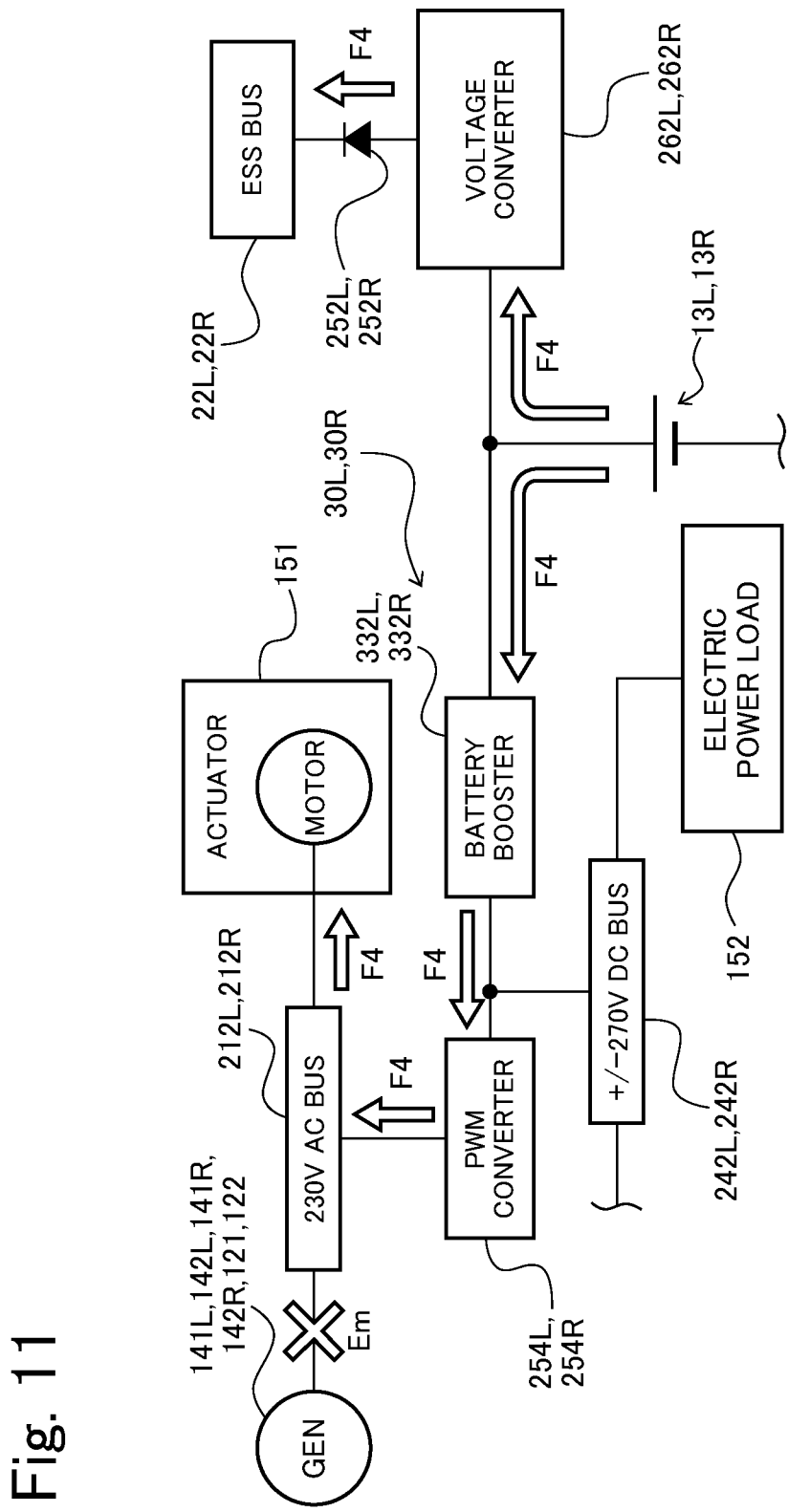
FIG. 11 is a schematic block diagram showing a state in which electric power is supplied from the secondary battery in a case where a situation in which the electric power is not supplied from the starter/generator occurs, in the electric system stabilizing system for the aircraft of FIG. 2.

As shown in FIG. 11, even when some abnormality (X arrow Em in FIG. 11) occurs in the starter/generator 141L, 142L, 141R, 142R and thereby the electric power is not supplied to the second primary AC bus 212L, 212R, the power stabilizing control section 36 in the AC power stabilizing device 30L, 30R causes the power converter section to supply the electric power from the secondary battery 13L, 13R to the second primary AC bus 212L, 212R, and the second DC bus 242L, 242R. This state corresponds to the state M4 in FIG. 8: backup state.

That is, when the AC power is not supplied from the starter/generator 141L, 142L, 141R, 142R, to the electrified devices via the primary AC bus 211L, 212L, 211R, 212R, the power stabilizing control section 36 causes the power converter section to convert the DC power from the secondary battery 13L, 13R into AC power so that the AC power can be supplied to the electrified devices temporarily (for a specified time) via the second primary AC bus 212L, 212R.

If a situation occurs, in which the electric power is not supplied from the starter/generator 141L, 142L, 141R, 142R, the auxiliary generator such as the APU starter/generator 121, 122, the RAT generator 171, etc., is activated. However, the auxiliary generator is not activated instantly, but a certain activation time (e.g., about 5 seconds) is required to activate the auxiliary generator. If the electric power is not supplied for such a very short time, the operation of the aircraft 100 may be negatively affected. Therefore, the power stabilizing control section 36 causes the power converter section to supply the DC power from the secondary battery 13L, 13R.

Specifically, receiving a signal indicating deactivation of the starter/generator 141L, 142L, 141R, 142R, and a backup request from the control system of the electric system 20L, 20R, the power stabilizing control section 36 generates the power command signal s1, s2 and outputs the power command signal s1, s2 to the power converter section so that the electric power is supplied from the secondary battery 13L, 13R toward the second primary AC bus 212L, 212R.

In the boost converter 332L, 332R or the second PWM converter 254L, 254R in the power converter section, the switching elements are switched based on the power command signal, and the DC power from the secondary battery 13L, 13R flows toward the second primary AC bus 212L, 212R as indicated by the block arrow F4 in FIG. 4 (the same direction as that of the block arrow R0-4). As a result, for a short period of time, the electric power can be supplied from the secondary battery 13L, 13R to the control surface actuator 151 via the second primary AC bus 212L, 212R as indicated by the block arrow F4 of FIG. 11.

Important power loads 15 which are at least required to enable the aircraft 100 to fly in safety, are connected to the essential bus 22L, 22R. In the present embodiment, during a period of time which passes before the auxiliary generator is activated after the simultaneous stopping of the starter/generator 141L, 142L, 141R, 142R or the like occurs, as indicated by the block arrow F4 in FIG. 11, the DC power from the secondary battery 13L, 13R can be supplied to the essential bus 22L, 22R via the voltage converter 262L, 262R, and the rectifier element 252L, 252R.

Specifically, the essential bus 22L, 22R is supplied with the DC power obtained by converting in the transformer/rectifier 251L, 251R, the AC power supplied from the starter/generator 141L, 141R, via the first primary AC bus 211L, 211R. In addition to this, the DC power from the secondary battery 13L, 13R in a higher voltage state is decreased in voltage by the voltage converter 262L, 262R, and always supplied to the essential bus 22L, 22R via the rectifier element 252L, 252R.

Therefore, in the case where electric power supply from the starter/generator 141L, 142L, 141R, 142R stops in emergencies, i.e., the AC power is not supplied from the starter/generator 141L, 142L, 141R, 142R to the essential bus 22L, 22R via the first primary AC bus 211L, 211R, the electric power can be supplied from the secondary battery 13L, 13R continuously. Therefore, without instantaneous discontinuation due to the switching of the relay components, the electric power can be supplied for make-up without discontinuation, which makes it possible to avoid unforeseen stoppage of important control systems.

Figure 12:
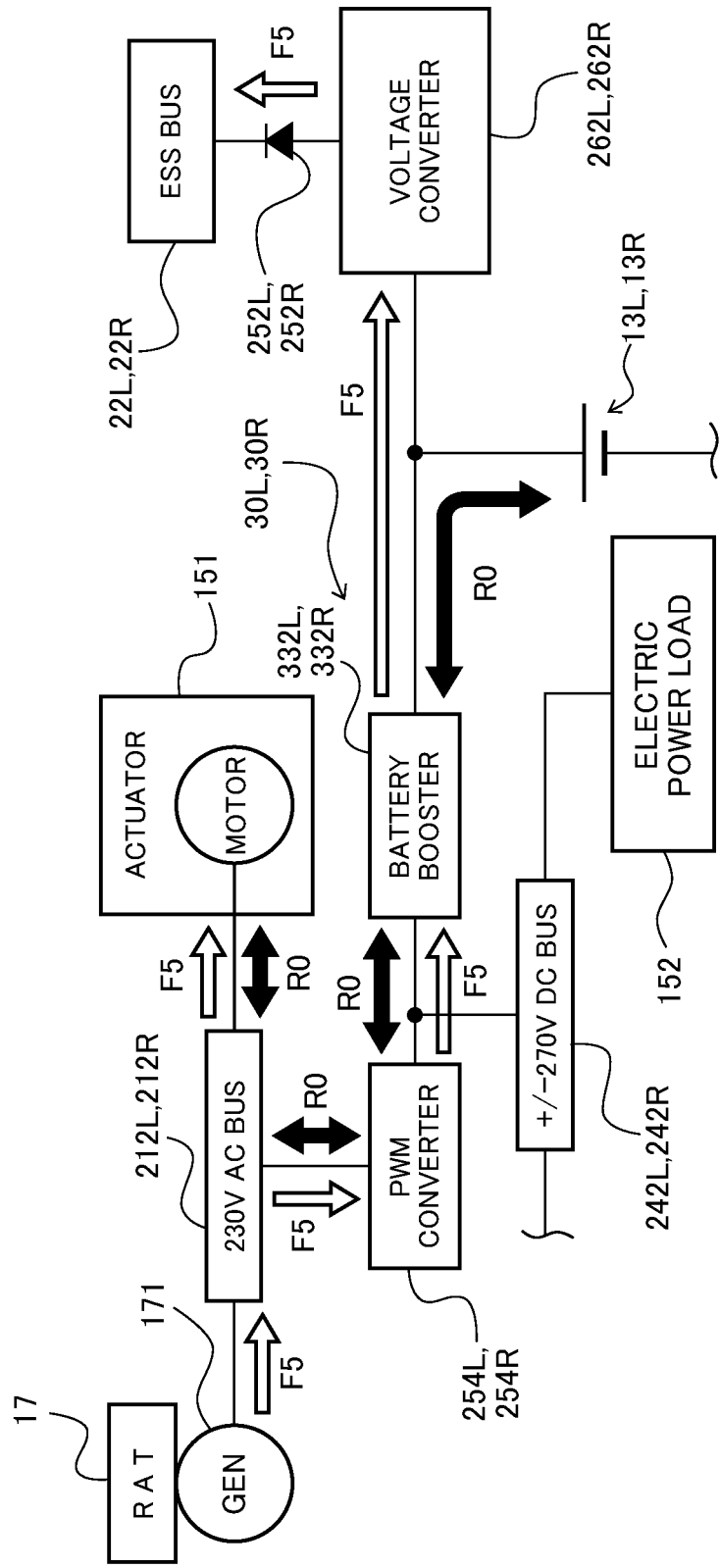
FIG. 12 is a schematic block diagram showing a state in which electric power is supplied from a ram air turbine generator to the actuator and to an essential bus, in the electric system stabilizing system for the aircraft of FIG. 2.

During the flight of the aircraft 100, if all of the starter/generators 141L, 142L, 141R, 142R mounted to the engines 11L, 11R, stop simultaneously, or the engines 11L, 11R stop, the RAT 17 is deployed outside the aircraft 100, and the RAT generator 171 of the RAT 17 is activated as schematically shown in FIG. 12. As described above, the RAT generator 171 is able to supply the electric power to the electric loads which are essential (requisite) for the aircraft 100 to fly in safety. In FIG. 12, the electric power supplied from the RAT generator 171 is indicated by the block arrow F5.

The electric loads which are essential for the aircraft to fly in safety include the control surface actuator 151 and the electrified devices connected to the essential buses 22L, 22R. Among these components, the control surface actuator 151 is the power load 15 (electrified device) which transiently requires a great load amount. By comparison, the RAT generator 171 is an emergency power supply, and therefore has a smaller power generation capacity than the/starter/generator 141L, 142L, 141R, 142R, etc. For this reason, in the electric system 20L, 20R, in the case of using only the RAT generator 171 as the AC power supply, a change is more likely to occur in the voltage or frequency (or both of the voltage and frequency) as compared to the case of using another AC power supplies. This might result in, for example, a situation in which the power load amount increases (overloaded) temporarily or the regenerative power is generated.

As a solution to the above, in the present embodiment, as indicated by the bidirectional block arrow R0 in FIG. 12, the AC power stabilizing device 30L, 30R performs stabilization control in such a manner that the AC power stabilizing device 30L, 30R causes the secondary battery 13L, 13R to absorb the voltage increase or to supply the electric power to make up for the deficient electric power due to the voltage decrease. Therefore, in the case where the RAT generator 171 is the AC power supply, the stabilizing system of the present embodiment can stabilize the electric system 20L, 20R more effectively.

Specifically, as indicated by the block arrow F5 in FIG. 12, the electric power is supplied from the RAT generator 171 to the control surface actuator 151 via the second primary AC bus 212L, 212R. Even when a temporary power load amount increases or regenerative power is generated, because of the control surface actuator 151, the AC power stabilizing device 30L, 30R performs stabilization control and thereby suppress such a voltage change (or frequency change).

The power stabilizing control section 36 causes the power converter section (boost converter 332L, 332R and second PWM converter 254L, 254R) in the AC power stabilizing device 30L, 30R to be able to convert the AC power of the RAT generator 171 into the DC power. Therefore, as indicated by the arrow F5 in FIG. 12, this DC power can be supplied to the essential bus 22L, 22R. Therefore, in the case of using the RAT generator 171 as the AC power supply, the AC power stabilizing device 30L, 30R can not only stabilize the electric system 20L, 20R but also serve as the power converter used to supply the DC power to the essential bus 22L, 22R.

Figure 16:
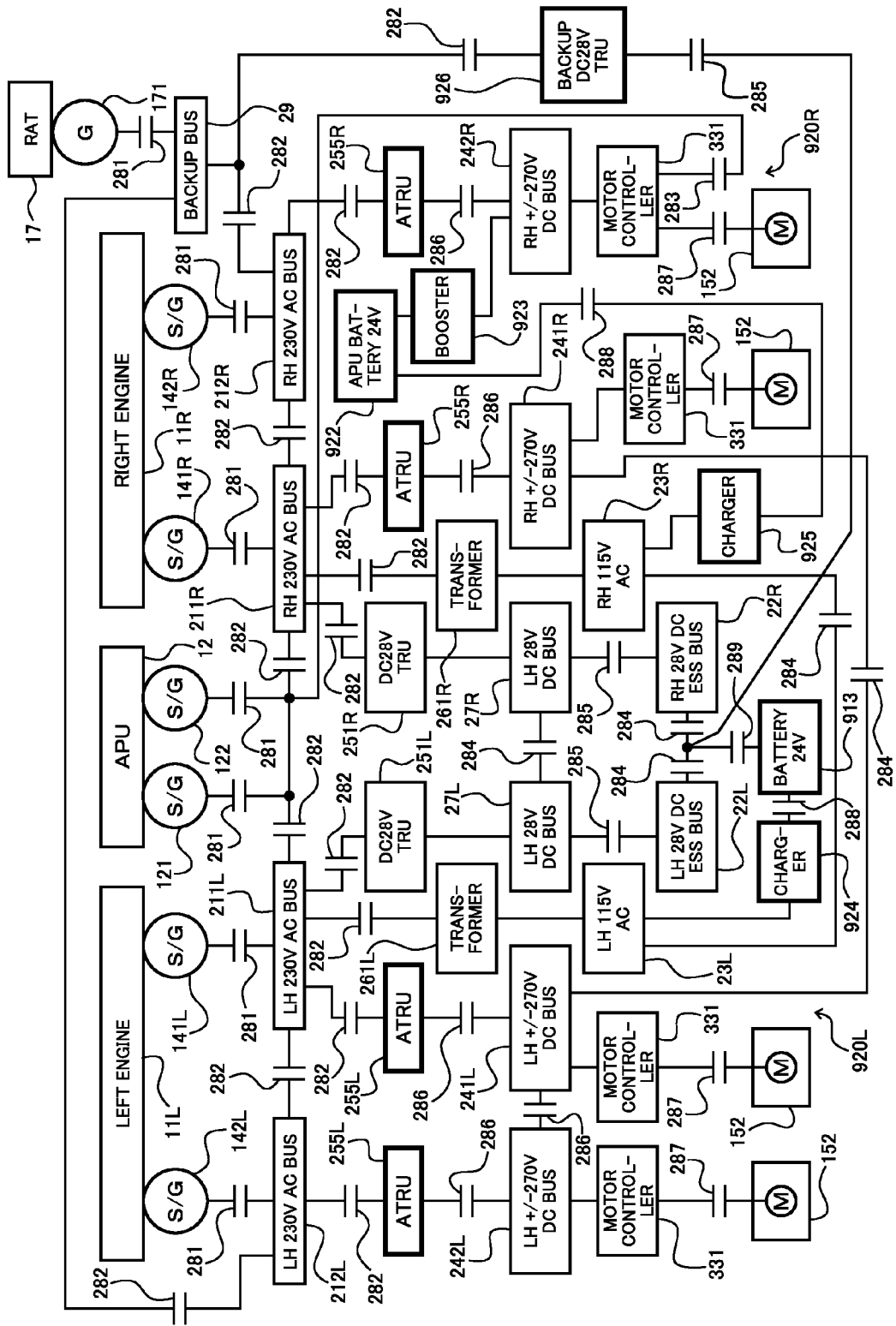
FIG. 16 is a schematic block diagram showing an exemplary configuration of a conventional general electric system for an aircraft.

In addition, the electric system stabilizing system for the aircraft of the present embodiment has an advantage that redundancy is improved or stabilization of the electric is improved, etc., as compared to the conventional general electric system. Specifically, as shown in FIG. 16, conventional electric system 920L, 920R fundamentally has the same configuration as that of the electric system 20L, 20R of FIG. 2 of the present embodiment. A secondary battery 913 is connected to a secondary AC bus 23L in the first lower system in the left electric system 920L via a secondary battery charger 924. The secondary battery 913 is connected to the essential bus 22L, 22R. A charging switch relay 288 is interposed between the secondary battery charger 924 and the secondary battery 913, while a battery power supply switch relay 289 is interposed between the secondary battery 913 and the essential bus 22L, 22R. In FIG. 16, for easier explanation, the control surface actuator 151 connected to the primary AC bus 212L, 212R is not shown.

An APU starting secondary battery 922 is connected to a secondary AC bus 23R in the first lower system in the right electric system 920R via an APU starting secondary battery charger 925. A second DC bus 242R in the second lower system is connected to the APU starting secondary battery 922 via a booster 923. A charging switch relay 288 is interposed between the APU starting secondary battery charger 925 and the APU starting secondary battery 922.

In the lower systems, rather than the PWM converters 253L, 254L, 253R, 254R, automatic transformer-rectifiers (ATRU) 255L, 255R are present between the primary AC buses 211L, 212L, 211R, 212R and the DC buses 241L, 242L, 241R, 242R. The ATRUs 255L, 255R are rectifiers for converting the AC power from the primary AC buses 211L, 212L, 211R, 212R into the DC power supplied toward the DC buses 241L, 242L, 241R, 242R.

In this configuration, as the DC power supply, two batteries, i.e., the secondary battery 913 which is a DC power supply of the essential bus 22L, 22R, and the APU starting secondary battery 922 provided exclusively for starting of the APU 12, are required. In addition, these secondary batteries 913, 922 are not connected to the AC power stabilizing device 30L, 30R of the present embodiment. Therefore, it is required that the secondary batteries 913, 922 be connected to the secondary battery charger 924 and the APU starting secondary battery charger 925, respectively, for the purpose of charging. Furthermore, since the APU starting secondary battery 922 is 24 VDC, it is necessary to boost the electric power by using the booster 923 to start the APU 12.

A backup transformer/rectifier 926 is connected to a backup bus 29 connected to the RAT generator 171. The backup transformer/rectifier 926 converts the AC power from the RAT generator 171 into the DC power and supplies the DC power to the essential bus 22L, 22R, and is connected to the essential bus 22L, 22R via the DC power supply switch relay 285.

As described above, in the conventional electric system 920L, 920R, the chargers 924, 925 are required to be provided to correspond to the secondary batteries 913, 922 (DC power supply), respectively. In addition, to start the APU 12, the booster 923 is required. In addition, to supply backup electric power from the RAT generator 171 to the essential bus 22L, 22R, a path including the backup transformer/rectifier 926 and the DC power supply switch relay 285 is required. In a case where the DC power is not supplied from the TRU 251L, 251R, it is necessary to supply the backup electric power from the secondary battery 913. To this end, the battery power supply switch relay 289 is required. Because of this, the kinds of the components (chargers, boosters, starting controllers, etc.) in the electric system increase, which may make the configuration of the electric system more complicated, and may possibly increase weight and cost, as compared to the present embodiment.

The rated voltage of the secondary battery 913 is 24 VDC and is substantially equal to the rated voltage 28 VDC of the essential bus 22L, 22R. Therefore, to charge the secondary battery 913, a dedicated charger 924 is necessary. Since the secondary battery 913 is charged by using the charger 924 for exclusive use via the secondary AC bus 23L, it is required that the battery power supply switch relay 289 intervene between the secondary battery 913 and the essential bus 22L, 22R. For this reason, the secondary battery 913 cannot be always be connected to the essential bus 22L, 22R.

In such a configuration, in a case where the electric power supply from the starter/generator 141L, 142L, 141R, 142R, stops in emergencies, in particular, in a case where the electric power is supplied from the secondary battery 13L, 13R by switching of the battery power supply switch relay 289, temporary electric power discontinuation (instantaneous discontinuation) occurs. By the discontinuation of the electric power, the electrified devices connected to the essential bus 22L, 22R stops temporarily (for a specified time). Therefore, to avoid the temporary stop, it is necessary to incorporate emergency power supplies such as batteries or capacitors into these electrified devices.

By comparison, as can be clearly seen from a comparison between the configuration of FIG. 16 and the configuration of FIG. 2, the electric system 20L, 20R of the present embodiment is configured such that the secondary battery 13L, 13R is always connectable to the essential bus 22L, 22R via the voltage converter 262L, 262R. Because of this, the discontinuation of the electric power will not occur even during switching to the emergency power supply. This eliminates a need for the emergency power supply to be built into the electrified device connected to the essential bus 22L, 22R. As a result, a weight of the electrified device will not occur and reliability can be improved.

In the present embodiment, as shown in FIG. 2, the left electric system 20L includes the AC power stabilizing device 30L and the secondary battery 13L, and the right electric system 20R includes the AC power stabilizing device 30R and the secondary battery 13R. Therefore, a doubled system for starting the APU 12 using the DC power supply is attained, and a doubled DC power supply for backing-up the essential bus 22L, 22R is attained. Furthermore, in the example of FIG. 2, each of the four lower systems includes one PWM converter. Therefore, even when the PWM converter in any one of the lower systems fails, the PWM converter in another lower system can be activated by switching the DC bus switch relay 286 present between the first DC bus 241L, 241R and the second DC bus 242L, 242R. Thus, redundancy can be improved.

In the present embodiment, the chargers 924, 925 become unnecessary and the APU starting controller 921 and the booster 923 become unnecessary. The path including the backup transformer/rectifier 926 and the DC power supply switch relay 285 becomes unnecessary in supply of the backup electric power from the RAT generator 171. The battery power supply switch relay 289 which may be a cause of the instantaneous discontinuation becomes unnecessary.

In the present embodiment, by using the PWM converter 253L, 253R, 254L, 254R, the voltage in the DC bus 241L, 242L, 241R, 242R can be stabilized as compared to the ATRU 255L, 255R. The ATRU has a drawback that it is capable of performing only AC to DC conversion and a voltage decreases occurs if a power load amount increases. On the other hand, the PWM converter is capable of performing both of AC to DC conversion and DC to AC conversion, and is configured to boost a voltage of AC power and supply DC power of a constant voltage. Therefore, in the present embodiment, the voltage in the DC bus connected to the PWM converter can be stabilized. Moreover, the DC bus is maintained at a constant voltage by the power stabilizing device.

Because of this, an input voltage range of the motor controller 331, 333 at a downstream side can be set high. This has an advantage that the size of the motor controller 331, 333 can be reduced as compared to the conventional configuration.

The secondary battery 13L, 13R has a high rated voltage sufficient to absorb a great power load, and is configured to supply the electric power to the starter/motor controller 333 via the power converter section (boost converter 332L, 332R) in the electric system 20L, 20R. For this reason, a current having a small value is sufficient to start the APU 12. Therefore, it becomes possible to reduce wires for a current with a great magnitude which is used to start the APU 12. This results in a reduced weight of a fuselage.

Modified Example

Although in the present embodiment, the secondary batteries 13L, 13R having the rated voltage of 250V are illustrated as the DC power supplies, the present invention is not limited to this. For example, the DC power supplies may be capacitors having an equal rated voltage, or a combination of capacitors and secondary batteries. As an example of the capacitor, an electric double-layer capacitor having a high capacity, which is named ultra capacitor, may be used. Thus, in the present invention, the DC power supplies are not limited to the secondary batteries 13L, 13R so long as they can absorb the regenerative power from the power loads 15.

A plurality of secondary batteries and/or capacitors may be combined to form DC power supplies provided that the weight of the aircraft is not increased excessively. In a case where the DC power supplies are the capacitors, stabilization of the electric system can be achieved but the APU 12 cannot be started. In view of this, to start the APU 12, a DC power supply for starting may be provided separately.

Although the stabilizing system of the present invention is suitably widely used in the aircraft 100 in which the MEA has progressed, the entire of the hydraulic system 40 and the entire of the breed air system 50, or most of them need not be electrified. For example, the great regenerative power in FIG. 10 is more likely to occur when great power loads 15 are present in the electric system 20L, 20R. Such power loads 15 include the control surface actuator 151, another motor, etc.

In particular, the control surface actuator 151 is used to operate the control surface of the aircraft 100 and operates rapidly according to the motion of the aircraft 100. Since a great regenerative power from the control surface actuator 151 is more likely to occur during the motion of the aircraft 100, the stabilizing system of the present invention is suitably employed in the aircraft 100 in which at least the control surface actuator 151 is electrified (electrically driven).

Although in the present embodiment, each of the electric systems 20L, 20R includes the first lower system and the second lower system, the present invention is not limited to this. Each of the electric systems 20L, 20R may be constructed of three or more lower systems. Or, each of the electric systems 20L, 20R may be configured not to include a lower system, but each electric system 20 may be constructed of a single system. Or, the lower systems in each of the electric systems 20L, 20R need not be equal in number.

Although in the present embodiment, the AC power stabilizing devices 30L, 30R are provided in the second lower systems, the present invention is not limited to this. The AC power stabilizing devices 30L, 30R may be provided in the first lower systems or in both of the first lower systems and the second lower systems.

Figure 13:
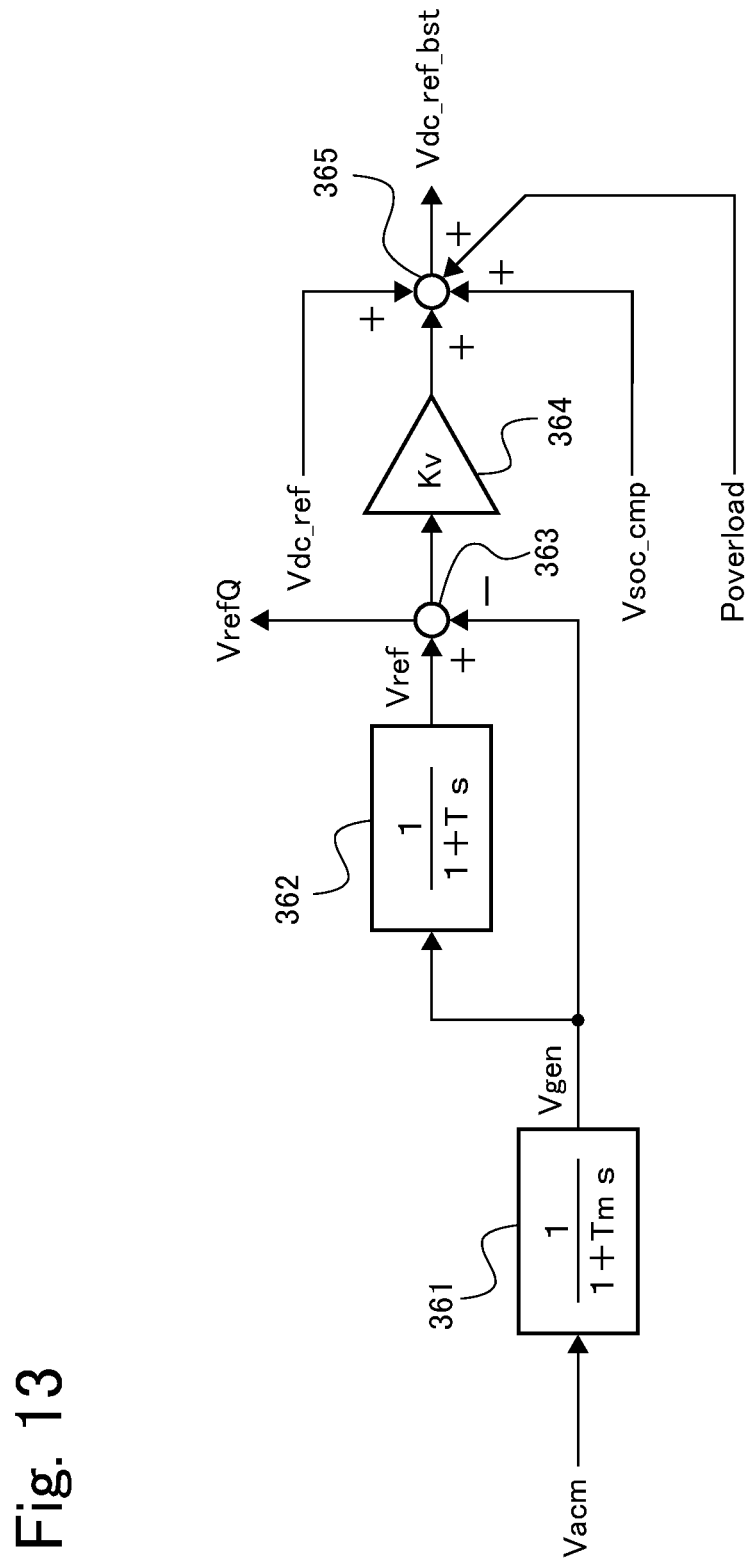
FIG. 13 is a block diagram showing another exemplary reference voltage regulation circuit of FIG. 6.
Figure 14:
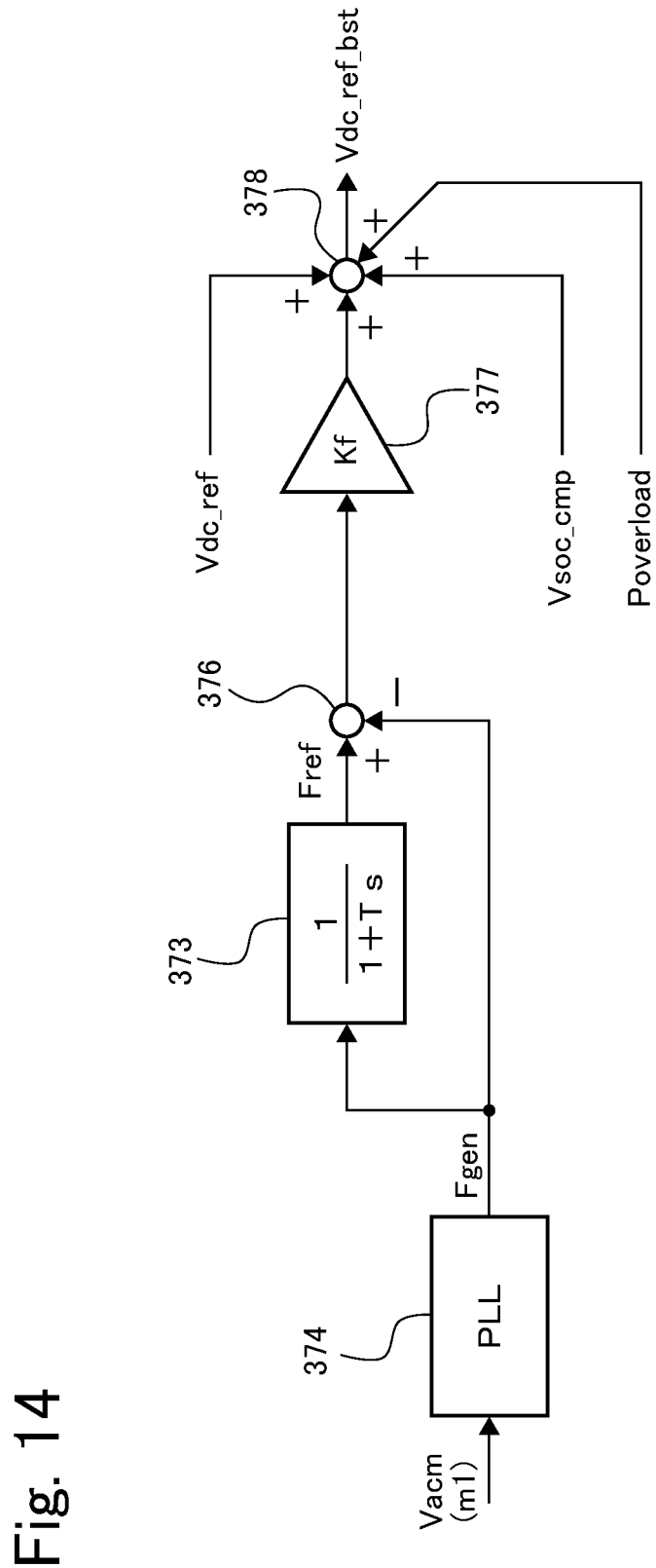
FIG. 14 is a block diagram showing another exemplary reference voltage regulation circuit of FIG. 7B.

In the electric system stabilizing system for aircraft of the present invention, as shown in FIGS. 13 and 14, the AC power stabilizing device 30L, 30R may be configured to supply a specified load from the secondary battery 13L, 13R to the second primary AC bus 212L, 212R, when an overload occurs in the AC power supply (the first starter/generator 141L, 141R, the second starter/generator 142L, 142R, the first APU starter/generator 121, the second APU starter/generator 122, or the RAT generator 171).

A description will be given of the AC power stabilizing device 30L, 30R capable of supplying a specified load from the secondary battery 13L, 13R, for example, in a case where the AC power supply is the VF generator (VF-adaptive type). In this case, as shown in FIG. 13, the power stabilizing control section 36 basically includes a reference voltage regulating circuit which is similar in configuration to the reference voltage regulating circuit of FIG. 6. The reference voltage regulating circuit of FIG. 13 is different from the reference voltage regulating circuit FIG. 5 in that an overload compensation value Poverload is input to the adder 365. The overload compensation value Poverload is a compensation value used to relieve (or substantially cancel) an overload of the AC power supply by supplying specified auxiliary electric power (auxiliary load) from the secondary battery 13L, 13R to the second primary AC bus 212L, 212R.

As in the reference voltage regulating circuit FIG. 6, in the reference voltage regulating circuit of FIG. 13, the subtractor 363 generates the subtraction value VrefQ and outputs the subtraction value VrefQ to the comparator/controller 344 of the PWM converter control circuit, and the adder 365 generates the reference voltage command value Vdc_ref_bst and outputs the reference voltage command value Vdc_ref_bst to the first subtractor 341 (see FIG. 5A) of the boost converter control circuit. As described above, the subtractor 363 generates the subtraction value VrefQ (difference between system voltage target value Vref and system voltage value Vgen) from the system voltage target value Vref and the system voltage value Vgen, and outputs the subtraction value VrefQ to the comparator/controller 364 as well as the PWM converter control circuit. The comparator/controller 364 generates a base value of the reference voltage command value from the subtraction value VrefQ and outputs the base value to the adder 365.

The base value from the comparator/controller 364, the preset target value Vdc_ref of the reference voltage, and the compensation voltage value Vsoc_cmp generated in the SOC compensation circuit are input to the adder 365. In addition to these, the preset overload compensation value Poverload is input to the adder 365. The adder 365 adds (sums up) the base value, the target value Vdc_ref, the compensation voltage value Vsoc_cmp, and the overload compensation value Poverload, to generate the reference voltage command value Vdc_ref_bst, and outputs the reference voltage command value Vdc_ref_bst to the boost converter control circuit.

The boost converter control circuit generates the output current command value Idc_ref based on the reference voltage command value Vdc_ref_bst and the measurement voltage value Vdcm, and outputs the output current command value Idc_ref to the boost converter 332L, 332R. As described above, the boost converter 332L, 332R is connected to the secondary battery 13L, 13R, and boosts a voltage of the DC power from the secondary battery 13L, 13R. As described above, the overload compensation value Poverload is reflected on the output current command value Idc_ref. Therefore, the active power (specified load) which address an overload can be supplied from the secondary battery 13L, 13R to the second primary AC bus 212L, 212R, even when the overload occurs in the AC power supply.

In the case where AC power supply is the CF generator, as shown in FIG. 14, the reference voltage regulating circuit included in the power stabilizing control section 36 has basically the same configuration as that of FIG. 7B. The reference voltage regulating circuit of FIG. 14 is different from the reference voltage regulating circuit of FIG. 7B in that the overload compensation value Poverload is output to an adder 378. The reference voltage regulation circuit of FIG. 14 generates the reference voltage command value Vdc_ref_bst, outputs the reference voltage command value Vdc_ref_bst to the PWM converter control circuit, the PWM converter control circuit generates the output current command value Idc_ref, outputs the output current command value Idc_ref to the boost converter 332L, 332R, and the boost converter 332L, 332R boosts the voltage of the DC power of the secondary battery 13L, 13R (supply a specified load from the secondary battery 13L, 13R), as in the case of the VF generator, which will not be described in detail in repetition. However, unlike the VF-adaptive type, the reference voltage regulating circuit of FIG. 14 generates the reference voltage command value Vdc_ref_bst, using the subtraction value of the frequency (difference between the system frequency target value Fref and system frequency Fgen), as in the case of the reference voltage regulating circuit of FIG. 7B.

As should be appreciated from the electric system stabilizing system for aircraft of the present invention, the output current command value Idc_ref used to control the boost converter 332L, 332R may be generated as the value which reflects the overload compensation value Poverload. Thus, even when an overload occurs in the AC power supply, the active power based on the overload compensation value Poverload is supplied from the secondary battery 13L, 13R. This makes it possible to effectively suppress or avoid an influence of an overload on the electric systems 20L, 20R, and reduce an overload capacity of the AC power supply.

Embodiment 2

Figure 15:
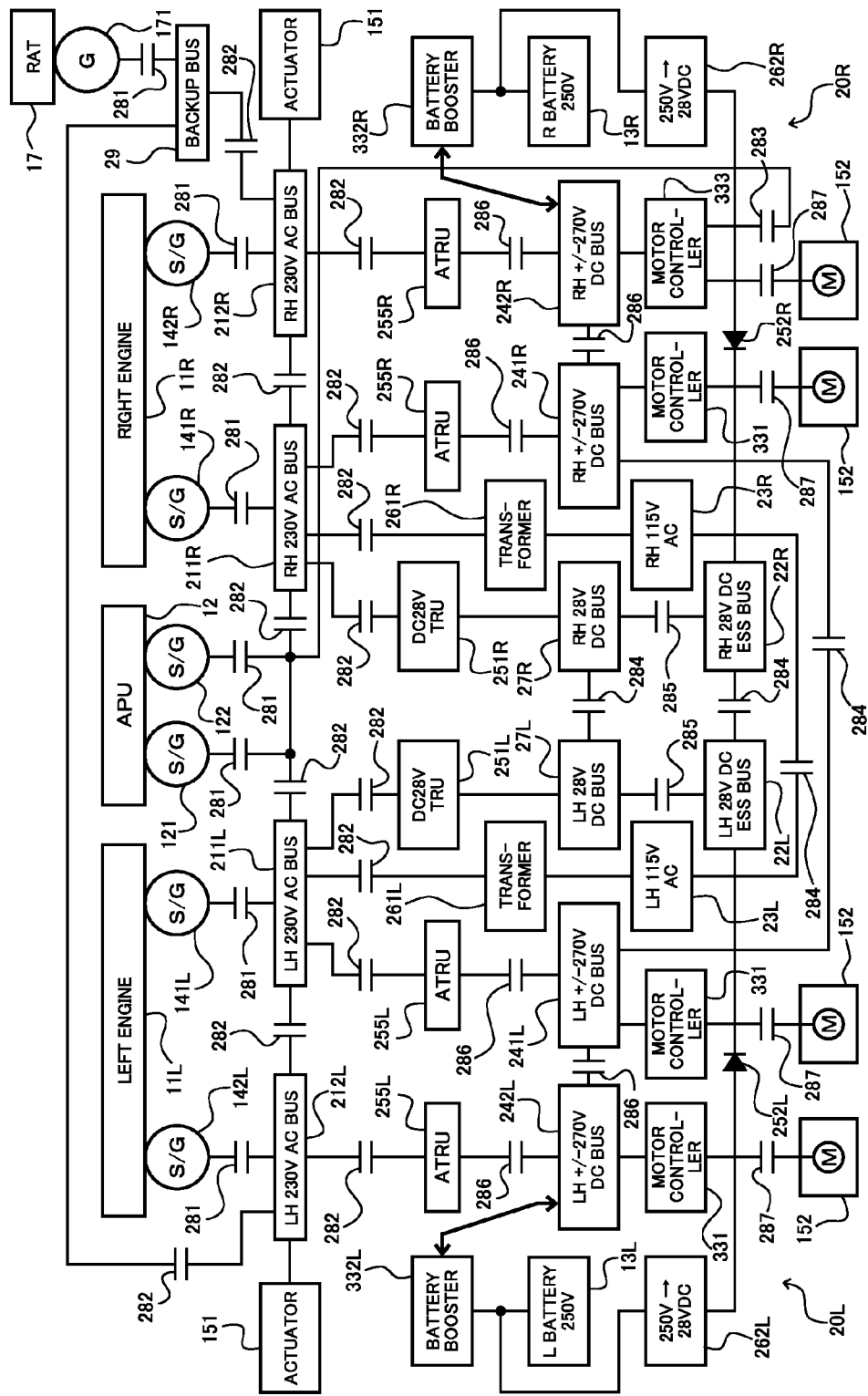
FIG. 15 is a schematic block diagram showing an exemplary configuration of an electric system stabilizing system for an aircraft according to Embodiment 2 of the present invention.

An electric system stabilizing system for the aircraft according to Embodiment 2 of the present invention has the same configuration as that of the electric system stabilizing system for the aircraft according to Embodiment 1, except that the secondary batteries 13L, 13R are bidirectionally connected to the second DC buses 242L, 242R via the boost converters 332L, 332R (bold-line arrow in FIG. 13) while keeping the ATRUs 255L, 255R, as shown in FIG. 15, instead of replacing the conventional ATRUs by the PWM converters.

Instead of controlling the electric power by increasing/decreasing the electric power in the second primary AC bus 212L, 212R like Embodiment 1, the DC power supplied to the second DC bus 242L, 242R via the ATRU 255L, 255R is directly controlled to indirectly control the electric power in the second primary AC bus 212L, 212R.

Specifically, the power stabilizing control section 36 (see FIGS. 3 and 4) monitors a voltage in the second primary AC bus 212L, 212R or a voltage in the second DC bus 242L, 242R. If the voltage is higher than a preset range, the power stabilizing control section 36 increases a charging current to the secondary battery 13L, 13R. This can increase a power load amount in the second primary AC bus 212L, 212R via the ATRU 255L, 255R, and hence indirectly decrease the voltage.

On the other hand, if the voltage in the second primary AC bus 212L, 212R or the voltage in the second DC bus 242L, 242R is lower than the preset range, the power stabilizing control section 36 increases a discharging current from the secondary battery 13L, 13R to increase the amount of electric power supplied to the motor controller 331, 333 at a downstream side. This can decrease a power load amount in the second primary AC bus 212L, 212R via the ATRU 255L, 255R, and hence indirectly increase the voltage.

In accordance with the configuration of the present embodiment, like Embodiment 1, it is not necessary to build the resistor into the controller of the control surface actuator 151 to consume the regenerative power by heat generation, or it is not necessary to increase a power generation capacity of the AC power supplies adaptively to a maximum load. In the case where electric power supply stops in emergencies, the electric power can be supplied from the secondary battery 13L, 13R continuously. Therefore, without instantaneous discontinuation due to the switching of the relay components, the electric power can be supplied for make-up.

Like Embodiment 1, the left electric system 20L includes the AC power stabilizing device 30L and the secondary battery 13L, and the right electric system 20R includes the AC power stabilizing device 30R and the secondary battery 13R. Therefore, a doubled system for starting the APU 12 using the DC power supplies is attained. The secondary batteries 13L, 13R can be utilized as power supply devices for supplying the electric power for starting (activating) the APU 12, and wires for a current with a great magnitude is reduced.

The rectifiers provided between the second primary AC buses 212L, 212R and the second DC buses 242L, 242R are not limited to the ATRUs 255L, 255R, but may be known transformer/rectifiers for converting AC power into DC power. Likewise, the rectifiers provided between the essential buses 22L, 22R and the starter/generator 141L, 142L, 141R, 142R, are not limited to TRU 251L, 251R, but may be known transformers/rectifiers which convert the AC power into the DC power.

The present invention is not limited to the above embodiments, but may be changed in various ways within a scope of the claims. Embodiments derived by suitably combining technical means disclosed in embodiments and plural modified examples are encompassed in a technical scope of the present invention.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

The present invention is suitably used in fields of stabilization of electric systems in commercial aircrafts, in particular, in fields of MEAs in which at least a portion of a power system, other than an electric system, is electrified (electrically driven).

REFERENCE CHARACTERS LIST 11L left engine
11R right engine
12 auxiliary power unit (APU, power supply device)
13L, 13R secondary battery (power supply device, DC power supply)
15 power loads
17 ram air turbine (RAT)
20L left electric system
20R right electric system
22L, 22R essential bus
23L, 23R secondary AC power supply bus (secondary AC bus)
27L, 27R DC power supply bus (DC bus)
29 backup bus
30L, 30R AC power stabilizing device
36 power stabilizing control section
100 aircraft
121 first APU starter/generator (power supply device, AC power supply)
122 second APU starter/generator (power supply device, AC power supply)
141L, 141R first starter/generator (power supply device, AC power supply)
142L, 142R second starter/generator (power supply device, AC power supply)
151 control surface actuator (power loads, electrified device)
152 other power load (hydraulic system, breed air system)
171 RAT generator (power supply device, AC power supply)
211L, 211R first primary AC power supply bus (first primary AC bus)
212L, 212R second primary AC power supply bus (second primary AC bus)
241L, 241R first DC power supply bus (first DC bus)
242L, 242R second DC power supply bus (second DC bus)
251L, 251R transformer/rectifier (TRU)
253L, 253R first PWM converter (power converter section)
254L, 254R second PWM converter (power converter section)
255L, 255R automatic transformer-rectifiers (ATRU, rectifier, power converter section)
261L, 261R transformer 262L, 262R voltage converter
281 primary power supply relay
282 secondary power supply relay
283 starting switch relay
331 motor controller (controller of the electrified device)
333 motor controller (starter/motor controller)
332L, 332R boost converter (power converter section)

The invention claimed is:

1. An electric system stabilizing system for aircraft, comprising at least:
an electric system including a DC power supply and an AC power supply as an electric power supply device, an AC power supply bus connected to the AC power supply, a DC power supply bus connected to the DC power supply, and a power converter section for converting AC power from at least the AC power supply into DC power to supply the DC power to the DC power supply bus via the AC power supply bus, the electric system being configured to supply electric power to an electrified device mounted in the aircraft via the AC power supply bus and the DC power supply bus; and
a power stabilizing device for stabilizing an electric power output of the electric power supply device;
wherein the DC power supply is configured to absorb regenerative power from the electrified device and transiently supply the electric power to the electrified device;
wherein the power stabilizing device includes a power stabilizing control section for controlling conversion of the electric power in the power converter section, an AC power supply bus monitoring section for monitoring at least a voltage in the AC power supply bus, and a DC power supply bus monitoring section for monitoring a voltage in the DC power supply bus; and
wherein the power stabilizing control section causes the DC power supply to be charged and discharged, based on the voltage in the AC power supply bus and the voltage in the DC power supply bus to stabilize the electric power in the AC power supply bus and the electric power in the DC power supply bus so that the electric system is stabilized.

2. The electric system stabilizing system for aircraft according to claim 1,
wherein the aircraft includes an auxiliary power unit (APU) and a ram air turbine (RAT);
the electric system includes as the AC power supplies, an APU starter/generator mounted to the auxiliary power unit and configured to generate the AC power, an AC power generator mounted to the engine, and a RAT generator mounted to the ram air turbine;
the electric system includes as the DC power supply, at least one of a secondary battery and a capacitor;
the DC power supply and the APU starter/generator are each connected to the power stabilizing device;
the AC power generator and the RAT generator are connected to the power stabilizing device via the AC power supply bus; and
the APU starter/generator is connected to the power stabilizing device via the AC power supply bus.

3. The electric system stabilizing system for aircraft according to claim 2,
wherein, to activate the auxiliary power unit in a deactivated state, the power stabilizing control section causes the power converter section to boost the DC power from the DC power supply and supply the DC power to activate the APU starter/generator.

4. The electric system stabilizing system for aircraft according to claim 2,
wherein in a state in which the DC power supply is in a chargeable state, the power stabilizing control section causes the power converter section to convert the AC power from the AC power generator or the APU starter/generator into the DC power, convert the DC power into a voltage adapted for charging by a boost converter, and supply the converted DC power to the DC power supply, to charge the DC power supply with the DC power.

5. The electric system stabilizing system for aircraft according to claim 2,
wherein the electric system includes:
an essential bus supplied with the electric power from the AC power generator via the AC power supply bus and having a lower rated voltage than the DC power supply; and
a voltage converter interposed between the essential bus and the DC power supply;
wherein the DC power supply is always connected to the essential bus via the power converter section; and
wherein in a state in which the AC power is not supplied from the AC power generator to the essential bus, the electric power is supplied to the essential bus without discontinuation.

6. The electric system stabilizing system for aircraft according to claim 5,
wherein in a state in which the AC power generator is deactivated and the RAT generator is supplying the AC power to the AC power supply bus, the power stabilizing control section causes the power converter section to convert the AC power from the RAT generator into the DC power and supply the DC power to the essential bus.

7. The electric system stabilizing system for aircraft according to claim 2,
wherein in the electric system, the single engine is provided with a plurality of AC power generators; and
each of the AC power generators is coupled with a system including the AC power supply bus, the power converter section, and the DC power supply bus, to construct a corresponding one of a plurality of lower systems, the plurality of lower systems corresponding to the plurality of AC power generators, respectively; and
in the plurality of lower systems, the AC power supply buses are connected to each other and the DC power supply buses are connected to each other.

8. The electric system stabilizing system for aircraft according to claim 7,
wherein in the plurality of lower systems included in the electric system, the DC power supply bus in at least one of the lower systems is connected to the APU starter/generator via a controller of the electrified device.

9. The electric system stabilizing system for aircraft according to claim 1,
wherein the electric system includes, as the power converter section, a PWM converter for performing mutual conversion between the DC power and the AC power, and a boost converter coupled to the PWM converter via the DC power supply bus; and
the power stabilizing control section causes the power converter section to charge and discharge the DC power supply based on a voltage in the AC power supply bus and a voltage in the DC power supply bus, to stabilize the electric power in the AC power supply bus and the electric power in the DC power supply bus.

10. The electric system stabilizing system for aircraft according to claim 9,
wherein the power stabilizing control section measures the voltage or frequency in the AC power supply bus and determines that a first-order lag value of a measurement value of the voltage or frequency in the AC power supply bus is a target value in control;
the power stabilizing control section adjusts a preset reference voltage command value for the boost converter based on a difference between the target value and the measurement value;
the power stabilizing control section controls an output current of the boost converter based on a difference between the adjusted reference voltage command value and the measurement value; and
the power stabilizing control section controls active power and reactive power in the PWM converter based on a difference between a measurement value of the voltage in the DC power supply bus and the preset reference voltage value of the PWM converter.

11. The electric system stabilizing system for aircraft according to claim 10,
wherein the power stabilizing control section multiplies a difference between the target value and the measurement value of the voltage or frequency in the AC power supply bus by a preset proportional constant, to generate a base value of the reference voltage command value, and
generates a compensation voltage value from a difference between the measurement value of SOC of the DC power supply and a preset target value of the SOC;
the power stabilizing control section adds the compensation voltage value and a preset target value of the reference voltage of the boost converter to the base value to generate a final value of the reference voltage command value; and
the power stabilizing control section controls an output current of the boost converter based on a difference between the final value of the reference voltage command value and the measurement value.

12. The electric system stabilizing system for aircraft according to claim 11,
wherein the power stabilizing control section adds to the base value of the reference voltage command value, the compensation voltage value, the target value of the reference voltage, and an overload compensation value preset to supply auxiliary electric power from the DC power supply to the AC power supply bus, to generate a final value of the reference voltage command value.

13. The electric system stabilizing system for aircraft according to claim 9,
wherein in a state in which AC power is not supplied from an AC power generator to the electrified device via the AC power supply bus,
the power stabilizing control section causes the power converter section to convert the DC power from the DC power supply into the AC power and supply the AC power to the electrified device via the AC power supply bus for a specified time period.

14. The electric system stabilizing system for aircraft according to claim 1,
wherein the electric system includes as the power converter section, a rectifier provided between the AC power supply bus and the DC power supply bus to convert the AC power into the DC power; and a boost converter connected to the DC power supply bus; and
the power stabilizing control section causes the DC power supply to be charged and discharged based on a voltage in the AC power supply bus and a voltage in the DC power supply bus to stabilize the electric power in the AC power supply bus and the electric power in the DC power supply bus.

15. The electric system stabilizing system for aircraft according to claim 1,
wherein the power stabilizing control section monitors a state of charge (SOC) of the DC power supply and makes compensation for a charging/discharging amount of the DC power supply based on a difference between a measurement value of the SOC and a preset target value of a charging rate.

16. The electric system stabilizing system for aircraft according to claim 9,
wherein when the AC power generated in the AC power supply has a variable frequency,
the power stabilizing control section causes the power converter section to charge the DC power supply in proportion to an increase in the voltage in order to make input of the active power increase, to input reactive power with a lagging power factor in proportion to the increase in the voltage, or to charge the DC power supply in proportion to the increase in the voltage in order to make the input of the active power increase and input the reactive power with the lagging power factor in proportion to the increase in the voltage, if the increase in the voltage is monitored; and
wherein when the AC power generated in the AC power supply has a variable frequency,
the power stabilizing control section causes the power converter section to discharge the DC power supply in proportion to a decrease in the voltage in order to make the input of the active power decrease, to input the reactive power with a leading power factor in proportion to the decrease in the voltage, or to discharge the DC power supply in proportion to the decrease in the voltage in order to make the input of the active power decrease and input the reactive power with the leading power factor in proportion to the decrease in the voltage, if the decrease in the voltage is monitored.

17. The electric system stabilizing system for aircraft according to claim 9,
wherein when the AC power generated in the AC power supply has a constant frequency,
the power stabilizing control section causes the power converter section to charge the DC power supply in proportion to an increase in the frequency in order to make input of the active power increase, if the increase in the frequency is monitored; and
wherein when the AC power generated in the AC power supply has a constant frequency,
the power stabilizing control section causes the power converter section to discharge from the DC power supply in proportion to a decrease in the frequency in order to make the input of the active power decrease, if the decrease in the frequency is monitored.

18. The electric system stabilizing system for aircraft according to claim 9,
wherein when the AC power generated in the AC power supply has a constant frequency,
the power stabilizing control section causes the power converter section to input reactive power with a lagging power factor in proportion to an increase in the voltage if the increase in the voltage is monitored; and wherein when the AC power generated in the AC power supply has a constant frequency, the power stabilizing control section causes the power converter section to input reactive power with a leading power factor in proportion to a decrease in the voltage if the decrease in the voltage is monitored.

19. The electric system stabilizing system for aircraft according to claim 1, wherein in the aircraft, at least either a hydraulic system or a breed air system is electrically driven; and a controller of the hydraulic system or breed air system which is electrically driven, is connected to the DC power supply bus.

20. A method of stabilizing an electric system for aircraft, the electric system including a DC power supply and an AC power supply as an electric power supply device, an AC power supply bus connected to the AC power supply, a DC power supply bus connected to the DC power supply, and a power converter section for converting AC power from at least the AC power supply into DC power to supply the DC power to the DC power supply bus via the AC power supply bus, the electric system being configured to supply electric power to an electrified device mounted in the aircraft via the AC power supply bus and the DC power supply bus, the method comprising:

using as the DC power supply, a DC power supply configured to absorb regenerative power from the electrified device and transiently supply the electric power to the electrified device;

controlling conversion of the electric power in the power converter section with a power stabilizing control section included in a power stabilizing device, an AC power supply bus monitoring section for monitoring at least a voltage in the AC power supply bus, and a DC power supply bus monitoring section for monitoring a voltage in the DC power supply bus; and charging and discharging the DC power supply based on the voltage in the AC power supply bus and the voltage in the DC power supply bus, to stabilize the electric power in the AC power supply bus and the electric power in the DC power supply bus, thereby stabilizing the electric system.

\* \* \* \* \*